US011675467B2

(12) United States Patent
Yamamoto

(10) Patent No.: US 11,675,467 B2
(45) Date of Patent: *Jun. 13, 2023

(54) POSITION INDICATOR INCLUDING CONDUCTOR THAT SURROUNDS CONDUCTIVE CORE BODY AND IS SELECTIVELY ELECTRICALLY COUPLED TO CHARGING ELEMENT OF POWER SUPPLY CIRCUIT

(71) Applicant: Wacom Co., Ltd., Saitama (JP)

(72) Inventor: Sadao Yamamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,132

(22) Filed: Jan. 28, 2022

(65) Prior Publication Data

US 2022/0155908 A1  May 19, 2022

Related U.S. Application Data

(63) Continuation of application No. 16/592,694, filed on Oct. 3, 2019, now Pat. No. 11,269,468, which is a
(Continued)

(30) Foreign Application Priority Data

Jun. 6, 2017 (JP) .............................. JP2017-111236

(51) Int. Cl.
*G06F 3/044* (2006.01)
*G06F 3/0338* (2013.01)
(Continued)

(52) U.S. Cl.
CPC .......... *G06F 3/0446* (2019.05); *G06F 3/0338* (2013.01); *G06F 3/0383* (2013.01);
(Continued)

(58) Field of Classification Search
CPC ...... G06F 3/033; G06F 3/0338; G06F 3/0346; G06F 3/0354; G06F 3/03545;
(Continued)

(56) References Cited

U.S. PATENT DOCUMENTS 9,063,025 B2     6/2015  Horie et al.
11,347,332 B2 *  5/2022  Yamamoto .......... G06F 3/03545
(Continued)

FOREIGN PATENT DOCUMENTS

JP    2011-186803 A    9/2011
JP    2013-161307 A    8/2013
(Continued)

OTHER PUBLICATIONS

International Search Report, dated May 29, 2018, for International Application No. PCT/JP2018/014180, 3 pages.

*Primary Examiner* — Amit Chatly
*Assistant Examiner* — Nelson Lam
(74) *Attorney, Agent, or Firm* — Seed IP Law Group LLP

(57) ABSTRACT

A position indicator that electrostatically interacts with a sensor includes: a casing having a pen shape; a conductive core body including a pen tip that protrudes from an opening on one end in the axial direction of the casing; a conductor surrounding the core body; a signal transmitting circuit which, in operation, generates a signal that electrostatically interacts with the sensor, and supplies the generated signal to the core body; and a control circuit which, in operation, produces different electrostatic interactions with the sensor by performing a first control operation that sets the conductor in a state of being grounded while the signal is sent out from the pen tip of the core body to the sensor, and performing a second control operation that sets the conductor in a state different from the state of being grounded.

20 Claims, 16 Drawing Sheets

Related U.S. Application Data continuation of application No. PCT/JP2018/014180, filed on Apr. 3, 2018.

(51) Int. Cl.
  *G06F 3/0354* (2013.01)
  *G06F 3/038* (2013.01)

(52) U.S. Cl.
  CPC ........ G06F 3/03545 (2013.01); G06F 3/0441 (2019.05); G06F 3/0442 (2019.05)

(58) Field of Classification Search
  CPC .... G06F 3/03546; G06F 3/041; G06F 3/0412; G06F 3/0414; G06F 3/044; G06F 3/047
  USPC .................................. 345/156–158, 173–179
  See application file for complete search history.

(56) References Cited

U.S. PATENT DOCUMENTS

| | | |
|---|---|---|
| 2007/0227785 A1 | 10/2007 | Katsurahira |
| 2008/0055279 A1 | 3/2008 | Osada et al. |
| 2009/0065269 A1 | 3/2009 | Katsurahira |
| 2009/0139780 A1 | 6/2009 | Katsurahira et al. |
| 2012/0068975 A1* | 3/2012 | Wei ........................ G06F 3/046 345/179 |
| 2012/0068984 A1* | 3/2012 | Chen ...................... G06F 3/046 345/211 |
| 2012/0127132 A1 | 5/2012 | Katsurahira et al. |
| 2012/0256830 A1 | 10/2012 | Oda et al. |
| 2014/0028587 A1 | 1/2014 | Sugiyama |
| 2014/0043301 A1 | 2/2014 | Katsurahira |
| 2014/0069532 A1 | 3/2014 | Obata |
| 2015/0130772 A1 | 5/2015 | Katsurahira |
| 2015/0160782 A1 | 6/2015 | Park et al. |
| 2015/0338930 A1 | 11/2015 | Hara |
| 2016/0018912 A1 | 1/2016 | Kaneda et al. |
| 2016/0188016 A1 | 6/2016 | Munakata et al. |
| 2016/0246389 A1 | 8/2016 | Munakata et al. |
| 2016/0313812 A1 | 10/2016 | Katsurahira |
| 2017/0308186 A1 | 10/2017 | Yamamoto |
| 2018/0011557 A1 | 1/2018 | Katsurahira et al. |

FOREIGN PATENT DOCUMENTS

| | | |
|---|---|---|
| JP | 2015-222518 A | 12/2015 |
| JP | 2016-153954 A | 8/2016 |
| JP | 2017-054544 A | 3/2017 |
| WO | 2017/043214 A1 | 3/2017 |

* cited by examiner

PERPENDICULAR TO INPUT SURFACE

INCLINED WITH RESPECT TO INPUT SURFACE

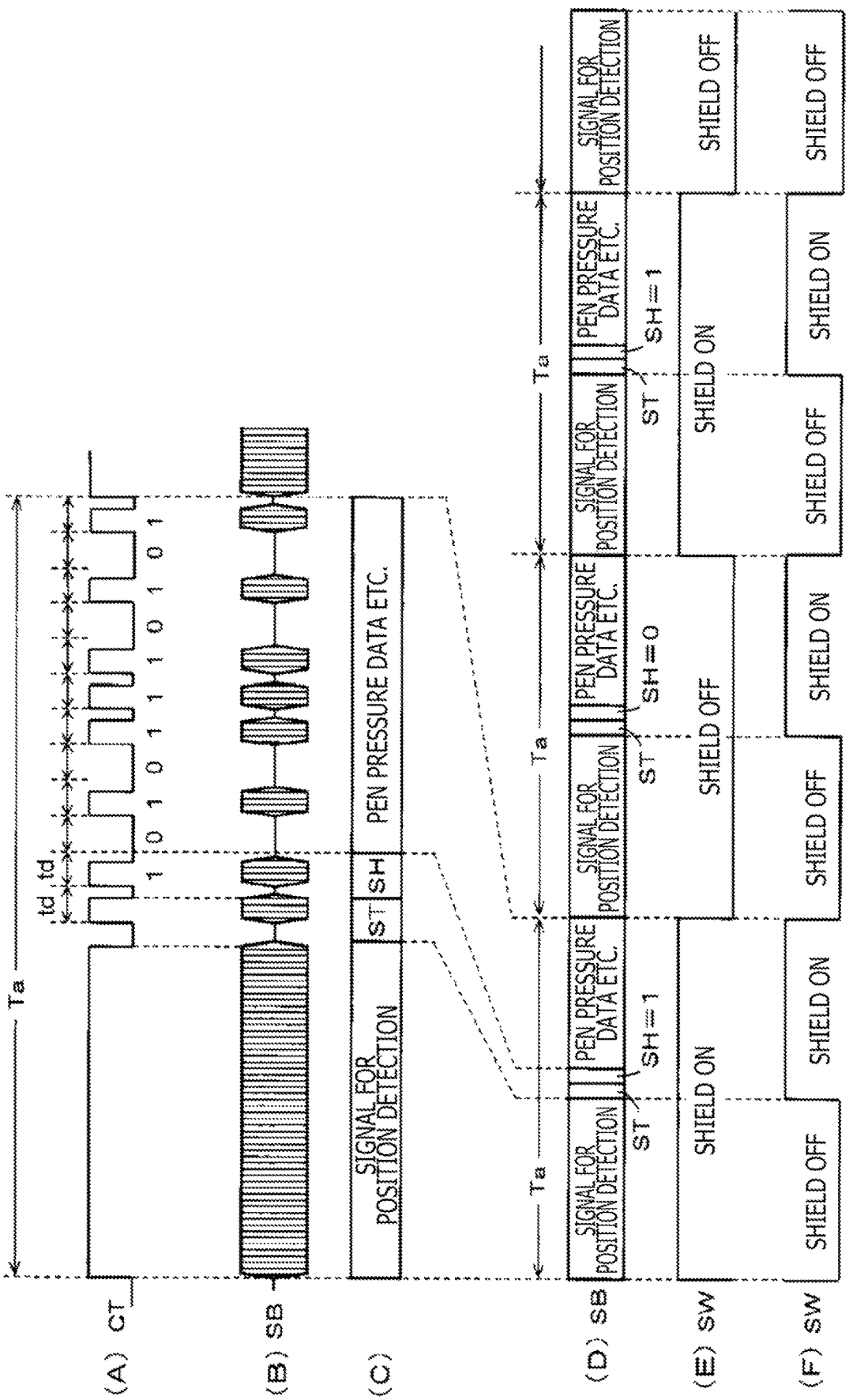

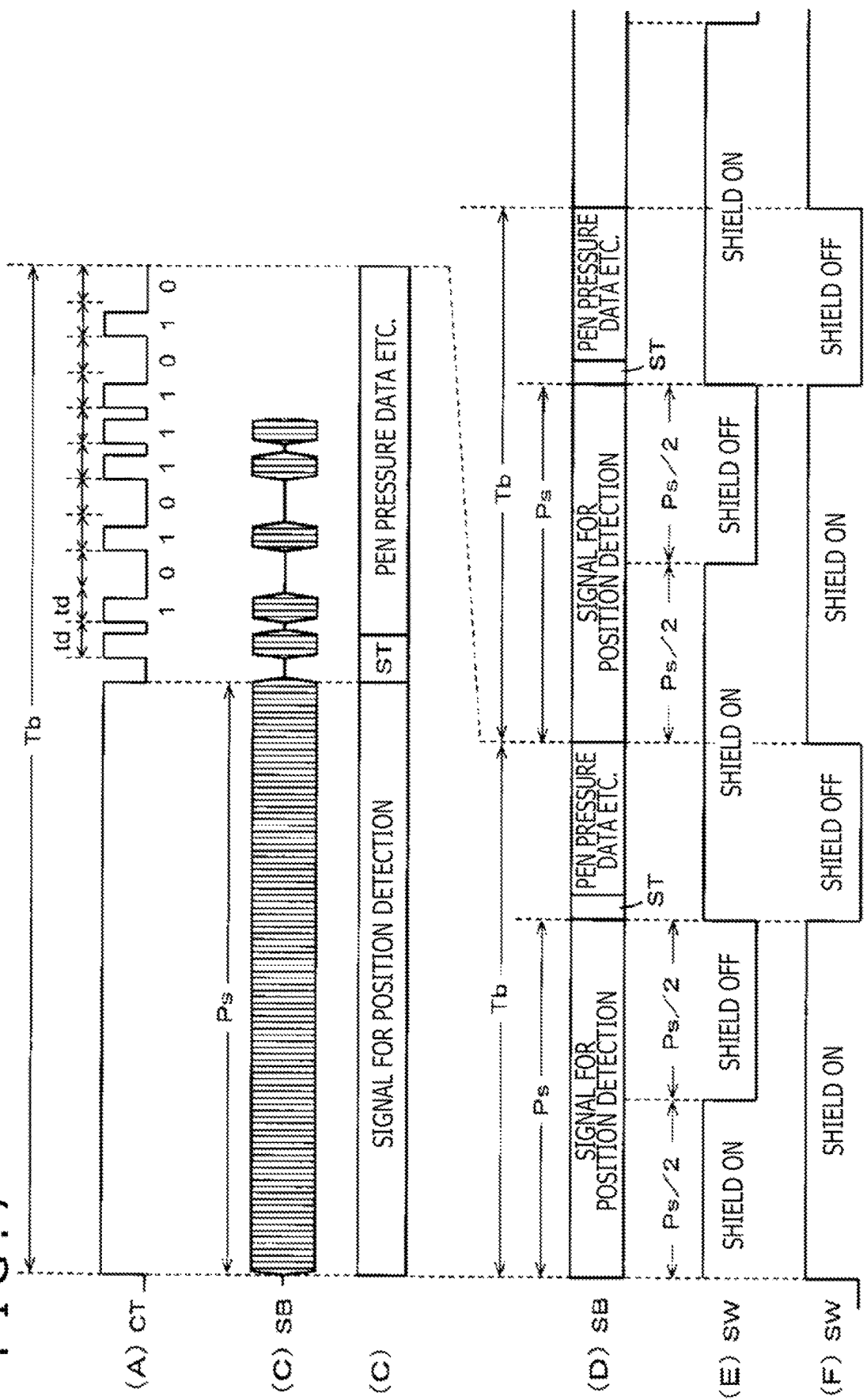

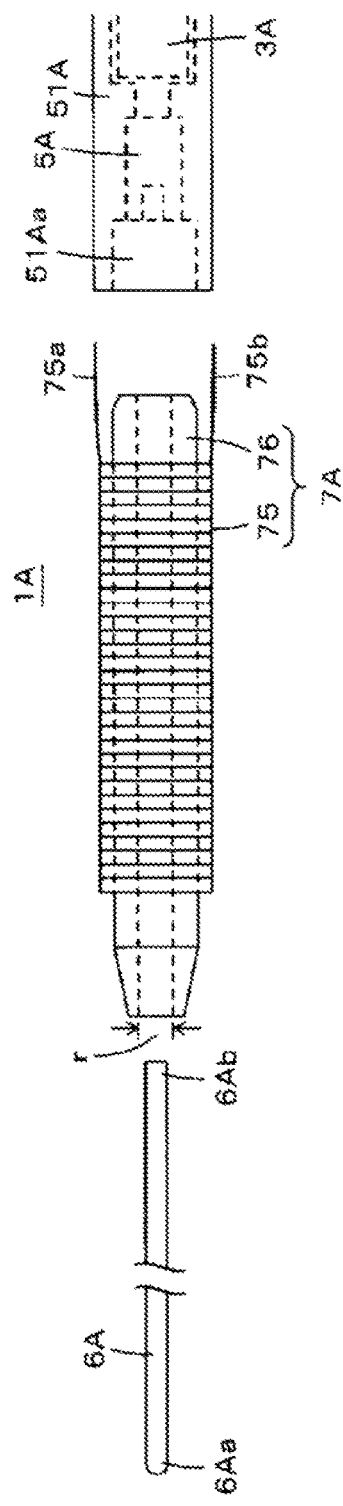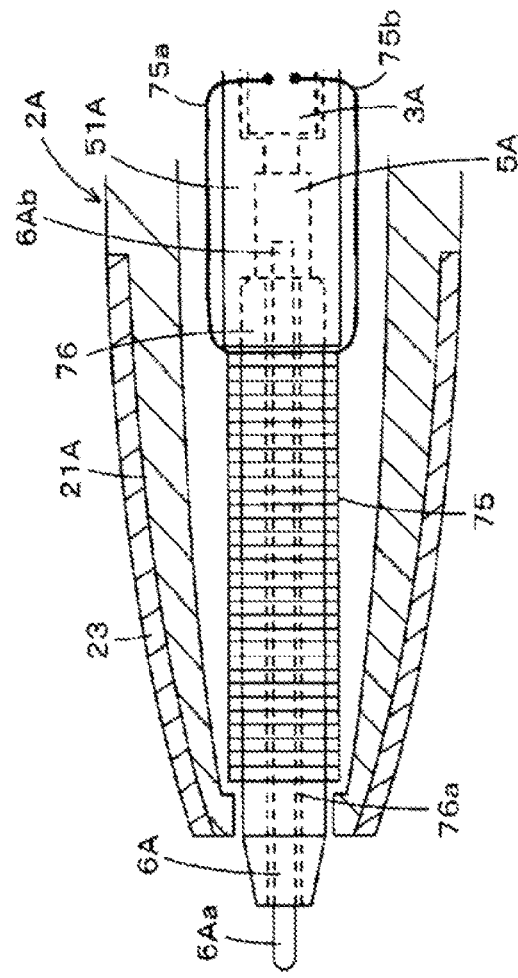

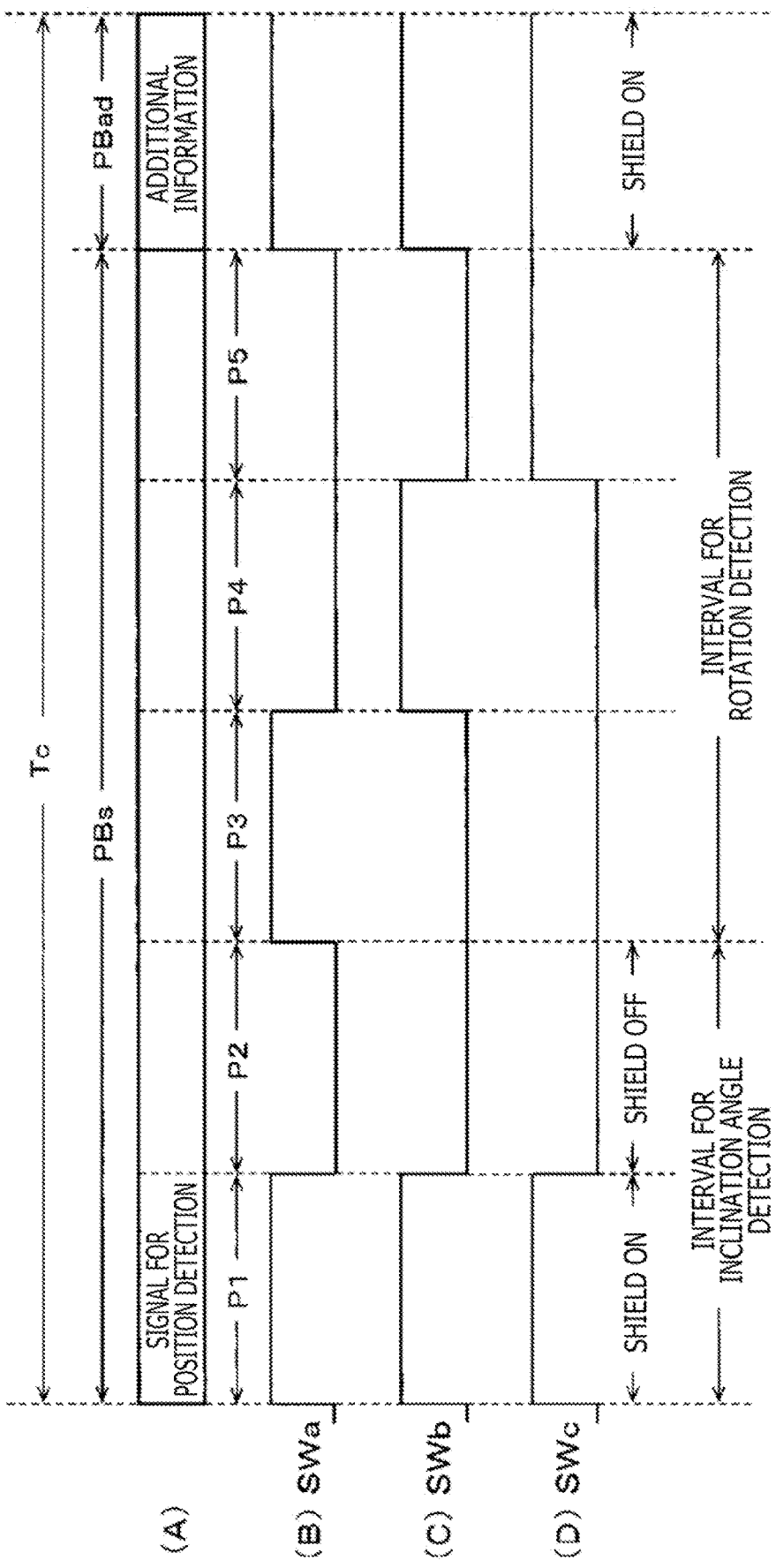

FIG.16A
(Prior Art)
FIG.16B
(Prior Art)
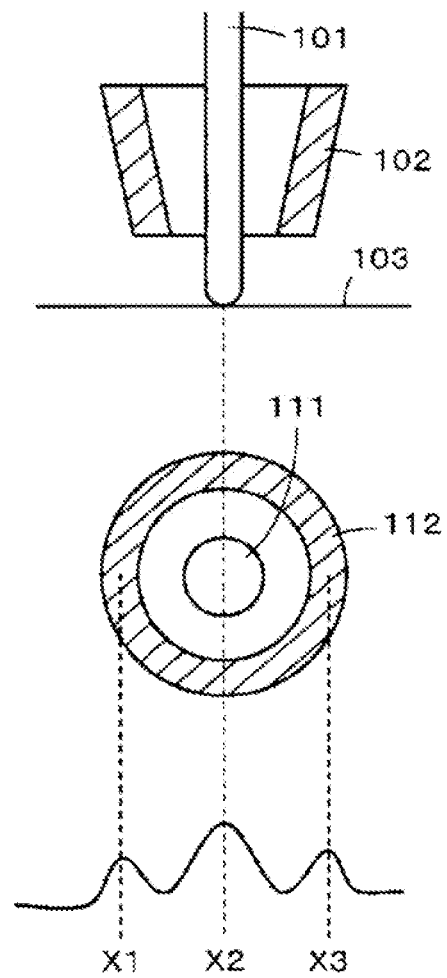
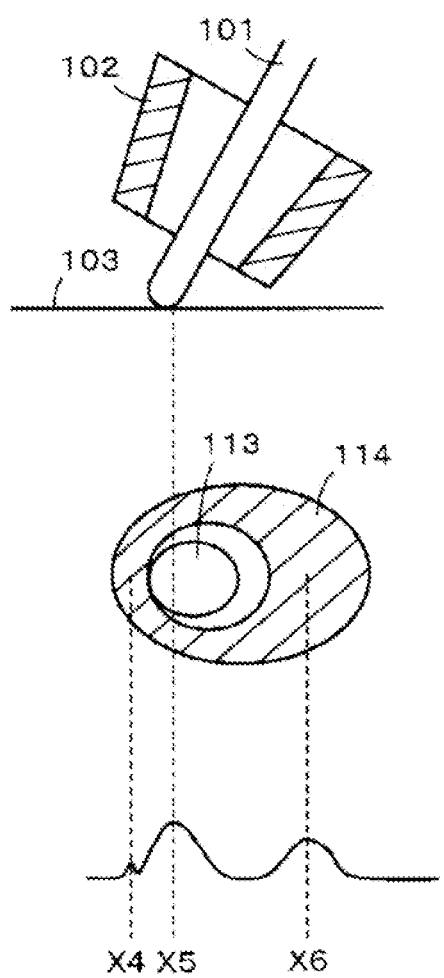

POSITION INDICATOR INCLUDING CONDUCTOR THAT SURROUNDS CONDUCTIVE CORE BODY AND IS SELECTIVELY ELECTRICALLY COUPLED TO CHARGING ELEMENT OF POWER SUPPLY CIRCUIT

BACKGROUND

Technical Field

The present disclosure relates to a capacitance type position indicator used in conjunction with a position detecting device, and more particularly to detecting an inclination angle with respect to an input surface.

Background Art

There has conventionally been a position indicator of this kind that enables detection of the inclination angle of a pen (inclination angle of the axial direction of a core body) with respect to the input surface (sensor surface) of a sensor of the position detecting device. The detected inclination angle is used to correct a cursor position on a display screen, which corresponds to the position of a pen tip of the position indicator, to the pen tip position, irrespective of the inclination angle of the position indicator, and is used to operate an application according to the inclination angle.

As a method of detecting the inclination angle of a capacitance type position indicator, a method has conventionally been proposed which detects the inclination angle by detecting two signals on a sensor side, the two signals being a signal sent out from a core body (signal electrode) to the sensor and a signal sent out from another signal electrode disposed at a position separated in an axial direction from a tip position of the core body with respect to the sensor surface (see, for example, Patent Document 1 (Japanese Patent Laid-Open No. 2016-153954) and the like).

FIGS. 16A and 16B are diagrams of assistance in explaining an inclination angle detecting method disclosed in Patent Document 1. A position indicator of Patent Document 1 is provided with a core body 101 sending out a signal for position detection and a tubular electrode 102 disposed separately from the core body 101 so as to surround the periphery of the core body 101 in the present example. In FIGS. 16A and 16B, the tubular electrode 102 is illustrated in section. The core body 101 penetrates a hollow portion of the tubular electrode 102, and the pen tip side of the core body 101 protrudes more to a sensor surface 103 side than the tubular electrode 102.

The upper portion of FIG. 16A illustrates a state in which the axial direction of the core body 101 of the position indicator is perpendicular to the sensor surface 103. At this time, a region in which a signal from the core body 101 is detected at a predetermined signal level or higher on the sensor surface 103 is a circular region 111 illustrated in the middle portion of FIG. 16A, and a region in which a signal from the electrode 102 is detected at the predetermined level or higher is a doughnut-shaped region 112 illustrated in the middle portion of FIG. 16A.

Hence, the reception levels of the signals from the position indicator in the sensor as viewed in the horizontal axis (X-axis) direction of the sensor surface, for example, are as illustrated in the lower portion of FIG. 16A. The level of the received signal from the core body 101 is a maximum, and the level of the received signal from the tubular electrode 102 is detected on both sides of the maximum. At this time, a distance between an X-coordinate value X2 at which a peak value of the level of the received signal from the core body 101 is obtained, and a position X1 at which a peak value of the level of the received signal from the tubular electrode 102 is obtained, and a distance between the X-coordinate value X2 and a position X3 are a same predetermined distance. The same is true for Y-coordinates.

In addition, the upper portion of FIG. 16B illustrates a state in which the axial direction of the core body 101 of the position indicator is inclined at a predetermined inclination angle with respect to the sensor surface. At this time, the region in which the signal from the core body 101 is detected at the predetermined signal level or higher on the sensor surface 103 is an elliptical region 113 illustrated in the middle portion of FIG. 16B, and the region in which the signal from the electrode 102 is detected at the predetermined signal level or higher is a deformed doughnut-shaped region 114 illustrated in the middle portion of FIG. 16B. At this time, relation between a distance between an X-coordinate value X5 at which a peak value of the level of the received signal from the core body 101 is obtained, and an X-coordinate position X4 at which a peak value of the level of the received signal from the tubular electrode 102 is obtained, and a distance between the X-coordinate value X5 and an X-coordinate position X6 is in accordance with the inclination of the core body 101, as illustrated in the lower portion of FIG. 16B. In addition, Y-coordinates are also in accordance with the direction of the inclination and the inclination angle.

Hence, a position detecting device can detect the inclination angle of the core body 101 from the X-coordinates and the Y-coordinates.

PRIOR ART DOCUMENT

Patent Document

Patent Document 1: Japanese Patent Laid-Open No. 2016-153954

BRIEF SUMMARY

Technical Problems

According to the above-described conventional core body inclination angle detecting method, signals need to be sent out from the two electrodes to the sensor. Thus, a configuration for supplying the signals to the two electrodes becomes complex. In addition, when the transmission signals are to be increased, the two electrodes may be driven at the same time. However, driving two circuits increases power consumption.

It is an object of the present disclosure to provide a position indicator that can solve the above problems.

Technical Solution

In order to solve the above problems, according to an embodiment of the present disclosure, there is provided a position that electrostatically interacts with a sensor. The position indicator includes: a casing having a pen shape; a conductive core body including a pen tip that protrudes from an opening on one end in an axial direction of the casing; a conductor surrounding the conductive core body; a signal transmitting circuit which, in operation, generates a signal that electrostatically interacts with the sensor, and supplies the generated signal to the core body; and a control circuit which, in operation, produces different electrostatic interactions with the sensor by performing a first control operation that sets the conductor surrounding the core body in a state of being grounded while the signal is sent out from the pen tip of the core body to the sensor, and performing a second control operation that sets the conductor surrounding the core body in a state different from the state of being grounded.

In the position indicator having the above-described configuration, while the signal is supplied to the sensor through the core body, the first control operation that sets the conductor surrounding the core body in the state of being grounded and the second control that sets the conductor in the state different from the state of being grounded are performed with regard to the electric state of the conductor surrounding the core body. That is, the position indicator sends out a signal from one electrode, and controls the electric state of the other electrode.

In the sensor receiving the signal from the position indicator, the level of a received signal as the signal from the position indicator and the detection region range of the received signal while the first control operation is performed, as well as the level of a received signal as the signal from the position indicator and the detection region range of the received signal while the second control operation is performed, change according to the inclination angle of the core body. Hence, a position detecting device can detect the inclination angle of the core body by detecting information based on the level of the received signal as the signal from the position indicator and the detection region range of the received signal while the first control is performed, as well as the level of the received signal as the signal from the position indicator and the detection region range of the received signal while the second control is performed.

BRIEF DESCRIPTION OF THE DRAWINGS

FIG. 6 is a timing diagram of assistance in explaining a first example of a signal transmission control method in the position indicator according to the first embodiment of the present disclosure.

FIG. 7 is a timing diagram of assistance in explaining a second example of the signal transmission control method in the position indicator according to the first embodiment of the present disclosure.

FIGS. 8 A and 8B illustrate diagrams of assistance in explaining an example of constitution of parts of a position indicator according to a second embodiment of the present disclosure.

FIG. 15 is a timing diagram of assistance in explaining operation of parts of the position indicator according to the third embodiment of the present disclosure.

FIGS. 16A and 16B illustrate diagrams of assistance in explaining an inclination angle detecting method of a conventional position indicator.

MODES FOR CARRYING OUT THE DISCLOSURE

Embodiments of a position indicator according to the present disclosure will hereinafter be described with reference to the drawings.

First Embodiment

Figure 1:
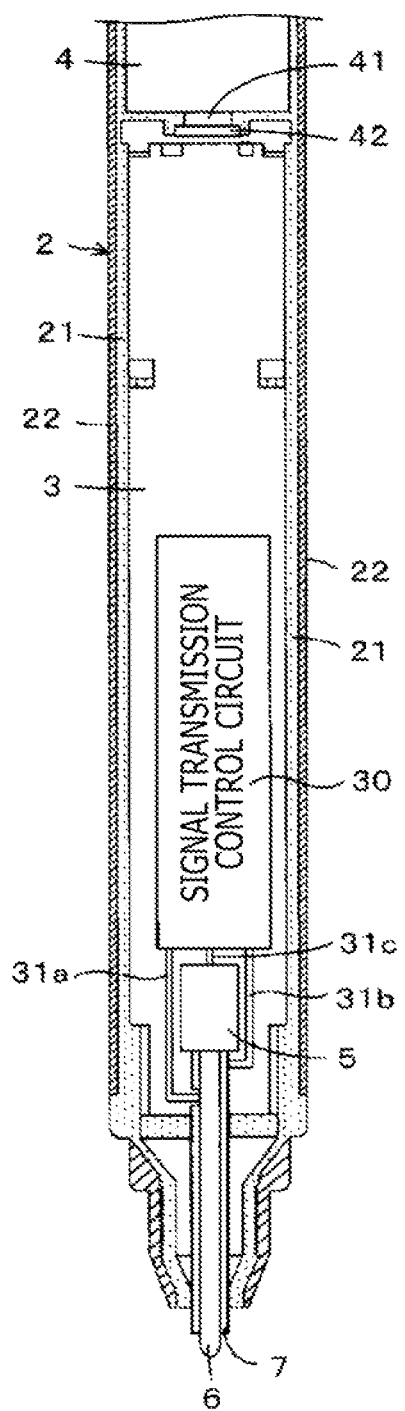
FIG. 1 is a diagram of assistance in explaining an example of constitution of a position indicator according to a first embodiment of the present disclosure.

FIG. 1 is a diagram of assistance in explaining an example of a configuration of a position indicator 1 according to a first embodiment of the present disclosure, and is a partial longitudinal sectional view of mainly a pen tip side. In the present embodiment, the position indicator 1 is formed such that an external appearance of the position indicator 1 has a pen shape.

[Description of Example of Structural Constitution of Position Indicator according to First Embodiment]

The position indicator 1 according to the present embodiment has a pen-shaped casing 2. The casing 2 is formed by a hollow cylindrical-shaped insulator portion 21 made of an insulating material, for example, a synthetic resin. In the present embodiment, at least a part of the outer circumferential surface of the insulator portion 21 of the casing 2, by which part an operator holds the position indicator 1, is covered by a conductor portion 22 formed of a metal, for example.

A printed circuit board 3, a battery 4 as a power supply circuit, and a pen pressure detector 5 are arranged within the casing 2. Though not illustrated, the conductor portion 22 covering the outer circumferential surface of the casing 2 is electrically connected to a grounding conductor of the printed circuit board 3. Incidentally, the battery 4 may be a dry cell, a rechargeable storage battery, or a power supply circuit including a capacitor such as an electric double layer capacitor to be described later or the like.

As illustrated in FIG. 1, a signal transmission control circuit 30, as well as other electronic parts and wiring patterns or the like not illustrated, is disposed on the printed circuit board 3. The signal transmission control circuit 30 generates a signal for position detection and additional information, and sends out the generated signal for position detection and the generated additional information from the position indicator 1.

The battery 4 is a supply source of power to electronic circuits and electronic parts formed on the printed circuit board 3. In FIG. 1, a terminal 42 is a terminal electrically connected to a power supply circuit part on the printed circuit board 3. A positive side electrode 41 of the battery 4 is in contact with the terminal 42 and electrically connected to the terminal 42. Though not illustrated, a negative side electrode of the battery 4 is set in pressing contact with a elastically displaceable terminal directly connected to the grounding conductor of the printed circuit board 3 or connected to the grounding conductor of the printed circuit board 3 via the conductor portion 22 of the casing 2.

As will be described later, in the present embodiment, the pen pressure detector 5 has a configuration of a variable capacitance capacitor, exhibiting a capacitance according to a pen pressure applied to a core body 6. Electrodes at both terminals of the variable capacitance capacitor formed in the pen pressure detector 5 are connected to the signal transmission control circuit 30 by a conductive pattern 31c in FIG. 1.

An end portion of the core body 6, which end portion is on an opposite side from a pen tip side projecting to the outside of the casing 2, is fitted into the pen pressure detector 5 disposed within a hollow portion of the casing 2. The core body 6 is thereby locked within the hollow portion of the casing 2 of the position indicator 1. Incidentally, the core body 6 is configured to be released from the state of being fitted to the pen pressure detector 5 by being pulled out. That is, the core body is replaceable for the position indicator 1.

The core body 6 is formed by a conductor, for example, a metal or a hard resin mixed with conductor powder. The core body 6 is electrically connected to the signal transmission control circuit 30 through a conductive pattern 31a. The signal for position detection and the additional information generated by the signal transmission control circuit 30 are sent out to a sensor of a position detecting device through the core body 6 formed of the conductor.

In the present embodiment, an intermediate portion of the core body 6 excluding the pen tip side of the core body 6 and the fitting side of the core body 6, which fitting side is fitted to the pen pressure detector 5, is covered by a tubular shielding member 7. The shielding member 7 is formed by a conductor. The conductor of the shielding member 7 is electrically connected to the signal transmission control circuit 30 through a conductive pattern 31b. As will be described later, the conductor of the shielding member 7 is switching-controlled by control of the signal transmission control circuit 30 between two states, that is, a state of being grounded in terms of alternating current and a state of floating in terms of potential.

In the state in which the conductor of the shielding member 7 is grounded in terms of alternating current, the part covering the core body 6 electrostatically shields the core body 6, and thus acts to suppress (shield) the sending of a signal from the part covering the core body 6. Hence, in the state in which the conductor of the shielding member 7 is grounded in terms of alternating current, a signal is sent out to the sensor mainly from only the pen tip side of the core body 6. On the other hand, when the conductor of the shielding member 7 is in a floating state in terms of potential, or when the conductor of the shielding member 7 is electrically connected to the core body 6, the electrostatic shielding of the shielding member 7 is released, and a signal is sent out from the whole of the core body 6 to the sensor.

Figure 2:
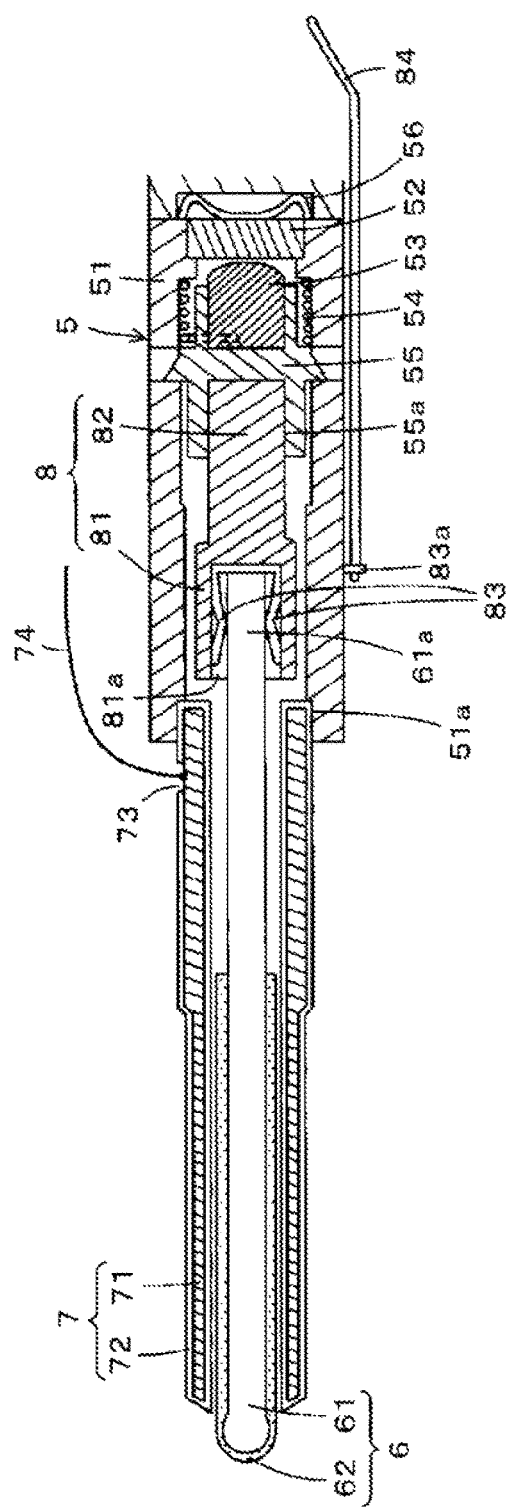
FIG. 2 is a diagram of assistance in explaining an example of constitution of parts of the position indicator according to the first embodiment of the present disclosure.

FIG. 2 is a diagram illustrating an example of detailed constitution of part of the core body 6, the shielding member 7, and the pen pressure detector 5. FIG. 2 illustrates a sectional view of the part of the core body 6, the shielding member 7, and the pen pressure detector 5.

As illustrated in FIG. 2, the core body 6 includes a core body main body portion 61 made of a conductive material, for example, a metal, and formed with a diameter of 1.9 mm, for example. In the present embodiment, about half on the pen tip side of the core body main body portion 61 is covered by a protective member 62 made of an insulative material. The protective member 62 has a role of preventing damage to the sensor input surface of the position detecting device and increasing an area of contact with the sensor input surface, and has a role of making insulation from a tubular conductor 71 of the shielding member 7 more secure.

As illustrated in FIG. 2, the shielding member 7 in the present embodiment has a constitution in which an insulating layer 72 covers substantially the entire surface of the tubular conductor 71 formed by a conductive material, the entire surface including the outer wall surface and inner wall surface of the tubular conductor 71.

The pen pressure detector 5 has a constitution of a variable capacitance capacitor that receives a pen pressure applied to the core body 6 through a pressure transmitting member 8, and has a variable capacitance. The pen pressure detector 5 in the present example uses pen pressure detection means having a well-known constitution described in Patent Document: Japanese Patent Laid-Open No. 2011-186803, for example, and constitutes a variable capacitance capacitor whose capacitance changes according to the pen pressure applied to the core body 6.

As illustrated in FIG. 2, the pen pressure detector 5 in the present example is formed by housing a plurality of parts, that is, a dielectric 52, a conductive member 53, an elastic member 54, a slide member 55, and a terminal member 56 within a housing member 51 made of an insulative material, for example, a resin. The terminal member 56 constitutes a first electrode of the variable capacitance capacitor formed by the pen pressure detector 5. In addition, the conductive member 53 and the elastic member 54 are electrically connected to each other to form a second electrode of the variable capacitance capacitor.

The slide member 55 is housed within the hollow portion of the housing member 51 so as to be movable in an axial direction. However, the slide member 55 is elastically biased to the pen tip side by the elastic member 54 at all times.

The pressure transmitting member 8 is fitted into a fitting recessed portion 55a of the slide member 55. The pressure transmitting member 8 includes a core body fitting portion 81 into which an end portion 61a of the core body main body portion 61 of the core body 6 is fitted, and a projecting portion 82 fitted into the slide member 55 of the pen pressure detector 5.

In addition, a fitting recessed portion 51a into which the shielding member 7 is fitted is formed at an end portion on the pen tip side of the housing member 51. An end portion of the shielding member 7, which end portion is on an opposite side from the pen tip side of the shielding member 7, is fitted into the fitting recessed portion 51a of the housing member 51. The shielding member 7 is thereby retained by the housing member 51. As illustrated in FIG. 2, the core body 6 is inserted through the inside of the hollow portion of the tubular conductor 71 of the shielding member 7, and the end portion 61a of the core body main body portion 61 is fitted into the core body fitting portion 81 of the pressure transmitting member 8.

The core body fitting portion 81 of the pressure transmitting member 8 is provided with a recessed portion 81a into which the end portion 61a of the core body main body portion 61 of the core body 6 is inserted, the end portion 61a being on an opposite side from the pen tip side of the core body main body portion 61. As illustrated in FIG. 2, provided within the recessed portion 81a of the pressure transmitting member 8 is a terminal piece 83 for making an electric connection between the end portion 61a of the core body main body portion 61 of the core body 6, and the signal transmission control circuit 30 on the printed circuit board 3. The terminal piece 83 is configured to elastically sandwich the end portion 61a of the core body main body portion 61 of the core body 6.

The core body main body portion 61 of the core body 6 is coupled to the pressure transmitting member 8 by inserting (press-fitting) the end portion 61a of the core body main body portion 61 of the core body 6 into the terminal piece 83, within the recessed portion 81a of the core body fitting portion 81 of the pressure transmitting member 8. The pen pressure applied to the core body 6 is transmitted to the pen pressure detector 5 to be described later via the pressure transmitting member 8. However, when the core body 6 is pulled with a predetermined force, the core body 6 can be decoupled and pulled out from the pressure transmitting member 8. That is, the core body 6 is replaceable.

An extension 83a is extended out from the terminal piece 83 within the recessed portion 81a of the pressure transmitting member 8. The extension 83a is connected to a lead electrode 84, which is connected to a conductor pattern connected to the signal transmission control circuit 30 on the printed circuit board 3. A signal from the signal transmission control circuit 30 on the printed circuit board 3 is thereby supplied to the core body main body portion 61 of the core body 6.

In addition, as illustrated in FIG. 2, a terminal portion 73, in which a part of the insulating layer 72 of the shielding member 7 is peeled off and the surface of the tubular conductor 71 is thus exposed, and the signal transmission control circuit 30 on the printed circuit board 3 are electrically connected to each other through a gold wire 74 (and the conductive pattern 31c), for example. The shielding member 7 is thereby controlled by the signal transmission control circuit 30.

In the constitution of FIG. 2, when a pen pressure is applied to the core body 6, the pen pressure is transmitted to the slide member 55 of the pen pressure detector 5 via the pressure transmitting member 8, and the slide member 55 moves the conductive member 53 to the dielectric 52 side against the elastic force of the elastic member 54 according to the applied pen pressure. Then, an area of contact between the conductive member 53 and the dielectric 52 changes according to the applied pen pressure, and the capacitance of the variable capacitance capacitor formed between the first electrode and the second electrode is varied according to the applied pen pressure.

[Description of Example of Constitution of Signal Transmission Control Circuit 30 of Position Indicator 1 according to First Embodiment]

Figure 3:
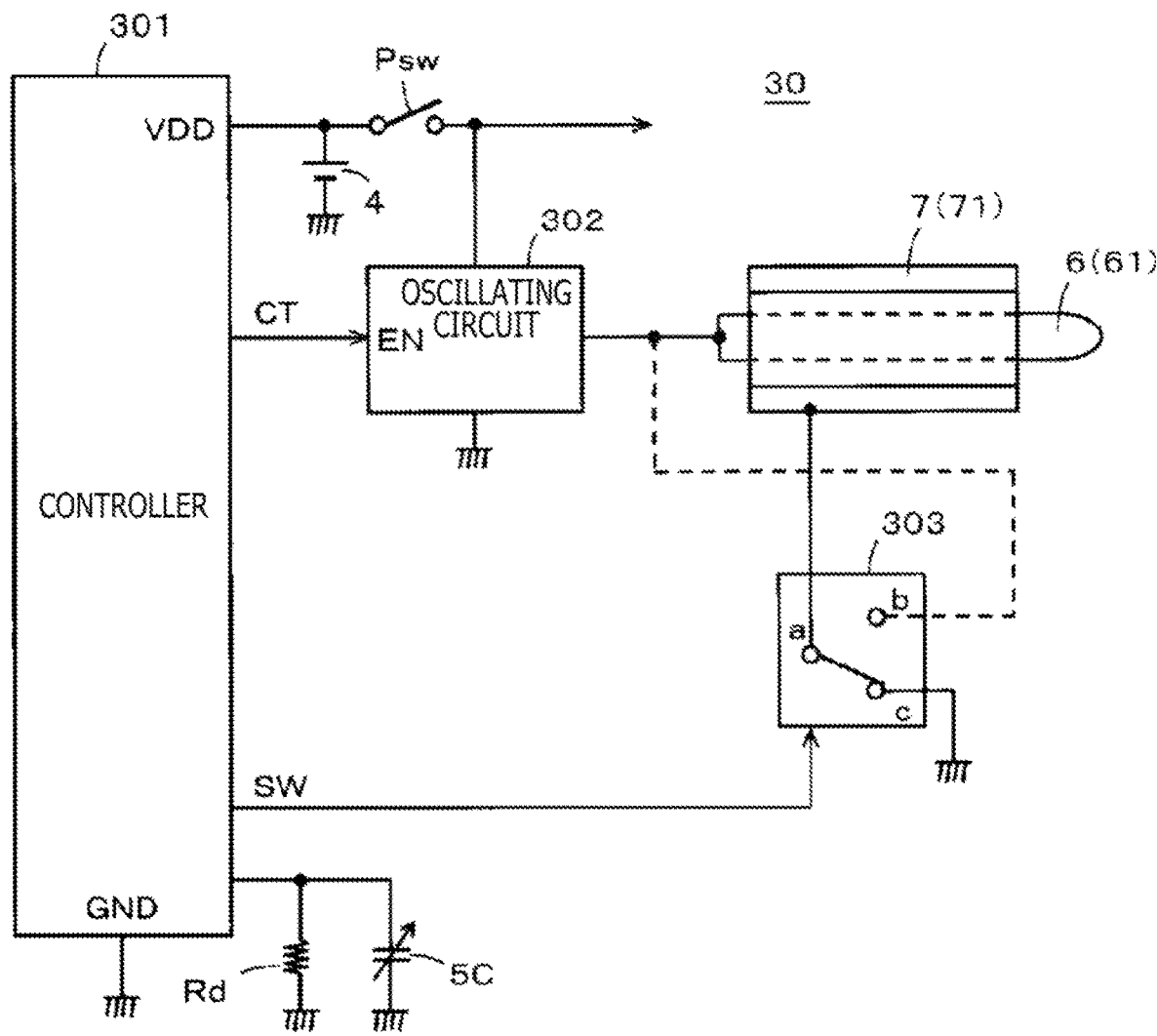
FIG. 3 is a diagram illustrating an example of a circuit configuration of a signal transmission control circuit of the position indicator according to the first embodiment of the present disclosure.

FIG. 3 is a circuit configuration diagram of the signal transmission control circuit 30 of the position indicator 1 according to the present embodiment. Specifically, the signal transmission control circuit 30 in the present example includes a controller 301, an oscillating circuit 302, and a switch circuit 303.

The controller 301 is constituted by a microprocessor, for example. The controller 301 forms a control circuit that controls processing operation as described later in the signal transmission control circuit 30 of the position indicator 1. The controller 301 is supplied with a power supply voltage VDD from the battery 4 as an example of a driving power supply. The controller 301 controls the oscillating circuit 302, and switching-controls the switch circuit 303. The power supply voltage VDD from the battery 4 is supplied as power supply voltage for the signal transmission control circuit 30 and other circuits via a power switch Psw. Though not illustrated in FIG. 1, the power switch Psw is turned on and off by pressing of an operating element provided on the side surface of the casing 2.

The controller 301 is also connected with a variable capacitance capacitor 5C formed by the pen pressure detector 5. The controller 301 detects a pen pressure applied to the core body 6 of the position indicator 1 by monitoring the capacitance of the variable capacitance capacitor 5C. Specifically, in the present embodiment, a discharging resistor Rd is connected to the variable capacitance capacitor 5C, and the controller 301 detects the capacitance of the variable capacitance capacitor 5C by measuring a discharge time taken for the variable capacitance capacitor 5C to reach a predetermined voltage across the variable capacitance capacitor 5C from a state in which the variable capacitance capacitor 5C is fully charged. The controller 301 detects the pen pressure from the detected capacitance.

The oscillating circuit 302 generates an alternating-current signal of a frequency f1=1.8 MHz, for example. The oscillating circuit 302 is supplied with the power supply voltage VDD from the battery 4 via the power switch Psw. A continuous wave of a predetermined duration of the alternating-current signal from the oscillating circuit 302, that is, a burst signal, becomes a signal for position detection, which signal is sent out to the sensor.

The controller 301 performs on-off control of the oscillating circuit 302 by supplying a control signal (enable signal CT) to an enable terminal EN of the oscillating circuit 302. The controller 301 thereby makes the burst signal and an ASK (Amplitude Shift Keying) modulated signal generated from the oscillating circuit 302. The oscillating circuit 302 interrupts the generated alternating-current signal according to the enable signal CT from the controller 301. The oscillating circuit 302 can thereby generate the burst signal and the ASK modulated signal. In the present embodiment, the controller 301 converts the value of the pen pressure detected as described above into a digital signal, and controls the oscillating circuit 302 according to the digital signal. The controller 301 thereby outputs information on the pen pressure value as the ASK modulated signal from the oscillating circuit 302.

The output terminal of the oscillating circuit 302 in the present embodiment is connected to the conductive core body main body portion 61 of the core body 6. The alternating-current signal from the oscillating circuit 302 is sent out to the sensor of the position detecting device through the conductive core body main body portion 61 of the core body 6.

The switch circuit 303 is switching-controlled by a switching control signal SW from the controller 301. A movable terminal a of the switch circuit 303 is connected to the tubular conductor 71 of the shielding member 7. One fixed terminal b of the switch circuit 303 is a free end, and another fixed terminal c of the switch circuit 303 is grounded. It suffices for the other fixed terminal c of the switch circuit 303 to be grounded in terms of alternating current. Thus, the other fixed terminal c of the switch circuit 303 may be configured to be connected to a terminal from which the power supply voltage VDD of the battery 4 is obtained.

When the movable terminal a of the switch circuit 303 is switched to the fixed terminal c side by the switching control signal SW from the controller 301, the tubular conductor 71 of the shielding member 7 is in a grounded state. Thus, the core body main body portion 61 of the core body 6, excluding the pen tip side and the fitting side fitted to the pen pressure detector 5, is electrostatically shielded by the tubular conductor 71 of the shielding member 7. A signal from the position indicator 1 is therefore sent out mainly from the pen tip side of the core body main body portion 61 of the core body 6.

In addition, when the movable terminal a of the switch circuit 303 is switched to the fixed terminal b side by the switching control signal SW from the controller 301, the tubular conductor 71 of the shielding member 7 is in a state of floating in terms of potential. Thus, the core body main body portion 61 of the core body 6 is not electrostatically shielded. A signal from the position indicator 1 is therefore sent out from substantially the whole of the core body main body portion 61 of the core body 6.

In the present embodiment, as described above, the state of sending out a signal from the position indicator 1 is changed by switching the switch circuit 303 between the two states described above, and furthermore the inclination angle of the position indicator 1 with respect to a sensor surface is detected by utilizing a fact that the state of receiving a signal from the position indicator 1 in the two states changes on the sensor surface on the position detecting device side according to the inclination angle of the position indicator 1.

Figure 4A:
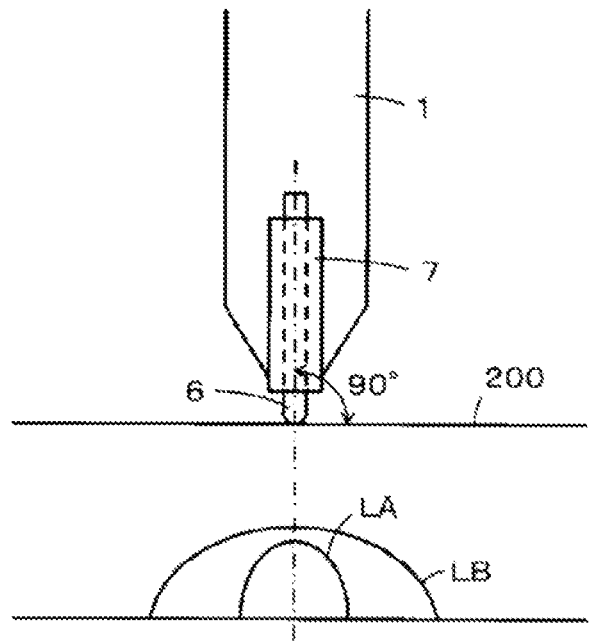
FIGS. 4 A and 4B illustrate diagrams of assistance in explaining an inclination angle detecting method in the position indicator according to the first embodiment of the present disclosure.

For example, when the axial direction of the core body 6 of the position indicator 1 is perpendicular (90 degrees) to the sensor surface 200 of the position detecting device, as illustrated in the upper portion of FIG. 4A, in the state in which the movable terminal a of the switch circuit 303 is connected to the fixed terminal c and thus the core body 6 is electrostatically shielded, a signal is sent out only from substantially a tip portion of the core body main body portion 61 of the core body 6. The sensor of the position detecting device therefore obtains a received signal of relatively steep signal levels, which signal exhibits a peak value at a tip position P0 of the core body 6, as indicated by a curve LA in the lower portion of FIG. 4A.

In addition, in the state in which the axial direction of the core body 6 of the position indicator 1 is perpendicular (90 degrees) to the sensor surface 200 of the position detecting device, as illustrated in the upper portion of FIG. 4A, and in the state in which the movable terminal a of the switch circuit 303 is connected to the fixed terminal b and thus electrostatic shielding is cleared, a signal is sent out from substantially the whole of the core body main body portion 61 of the core body 6. The sensor of the position detecting device therefore obtains a received signal of signal levels having a relatively broad strength distribution, though the received signal exhibits a peak value at the tip position P0 of the core body 6 as in the state in which the movable terminal a of the switch circuit 303 is connected to the fixed terminal c, as indicated by a curve LB in the lower portion of FIG. 4A.

Figure 4B:
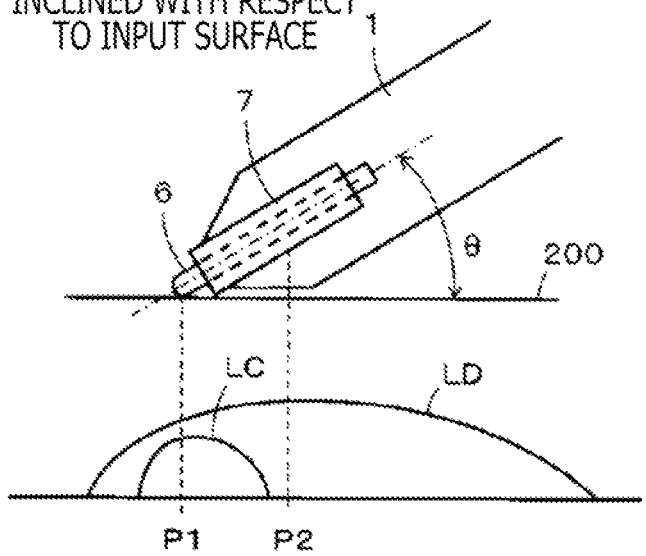

On the other hand, when the axial direction of the core body 6 of the position indicator 1 is inclined at an inclination angle θ with respect to the sensor surface 200 of the position detecting device as illustrated in the upper portion of FIG. 4B, for example, in the state in which the movable terminal a of the switch circuit 303 is connected to the fixed terminal c and thus the core body 6 is electrostatically shielded, due to a signal sent out only from substantially the tip portion of the core body main body portion 61 of the core body 6, the sensor of the position detecting device obtains a received signal of relatively steep signal levels, which signal exhibits a peak value at a position P1 slightly shifted from the tip position of the core body 6, as indicated by a curve LC in the lower portion of FIG. 4B.

In addition, in the state in which the axial direction of the core body 6 of the position indicator 1 is inclined at the inclination angle θ with respect to the sensor surface 200 of the position detecting device, as illustrated in the upper portion of FIG. 4B, and in the state in which the movable terminal a of the switch circuit 303 is connected to the fixed terminal b and thus electrostatic shielding is cleared, a signal is sent out from substantially the whole of the core body main body portion 61 of the core body 6. The sensor of the position detecting device therefore obtains a received signal of signal levels having a relatively broad strength distribution, the received signal exhibiting a peak value at a position P2 that differs according to the magnitude of the inclination angle θ in the state in which the movable terminal a of the switch circuit 303 is connected to the fixed terminal c, as indicated by a curve LD in the lower portion of FIG. 4B.

Incidentally, as illustrated in FIG. 3, the switch circuit 303 is provided to produce the state in which the core body 6 is electrostatically shielded by the tubular conductor 71 of the shielding member 7 and the state in which the core body 6 is not electrostatically shielded. Hence, as indicated by a dotted line in FIG. 3, a configuration may be adopted in which the output terminal of the oscillating circuit 302 is connected to the fixed terminal b of the switch circuit 303.

From the above, the position detecting device can detect the inclination angle of the axial direction of the core body 6 of the position indicator 1 with respect to the sensor surface 200 by detecting received signals in the two respective states, that is, the state in which the core body 6 is electrostatically shielded by the shielding member 7 in the position indicator 1 and the state in which the electrostatic shielding of the core body 6 by the shielding member 7 is cleared, and detecting positions at which peak values of levels of the respective received signals are exhibited.

Specifically, in the state in which the positions at which peak values of the received signals in the two states, respectively, are exhibited coincide with each other as described above, the position detecting device can detect that the inclination angle of the axial direction of the core body 6 of the position indicator 1 with respect to the sensor surface 200 is 90 degrees. When the positions at which the peak values of the received signals in the two states, respectively, are exhibited do not coincide with each other, the inclination angle of the axial direction of the core body 6 of the position indicator 1 with respect to the sensor surface 200 can be detected from a distance between the positions at which those two peak values are exhibited.

In addition, according to the position indicator 1 of the foregoing first embodiment, when signals such as a signal for position detection, additional information, and the like are sent out to the sensor in the state in which the core body 6 is electrostatically shielded by the shielding member 7, the signals sent out by the core body 6 are not affected even when the casing 2 of the position indicator 1 is held by a hand.

[Description of Example of Constitution of Position Detecting Device]

Figure 5:
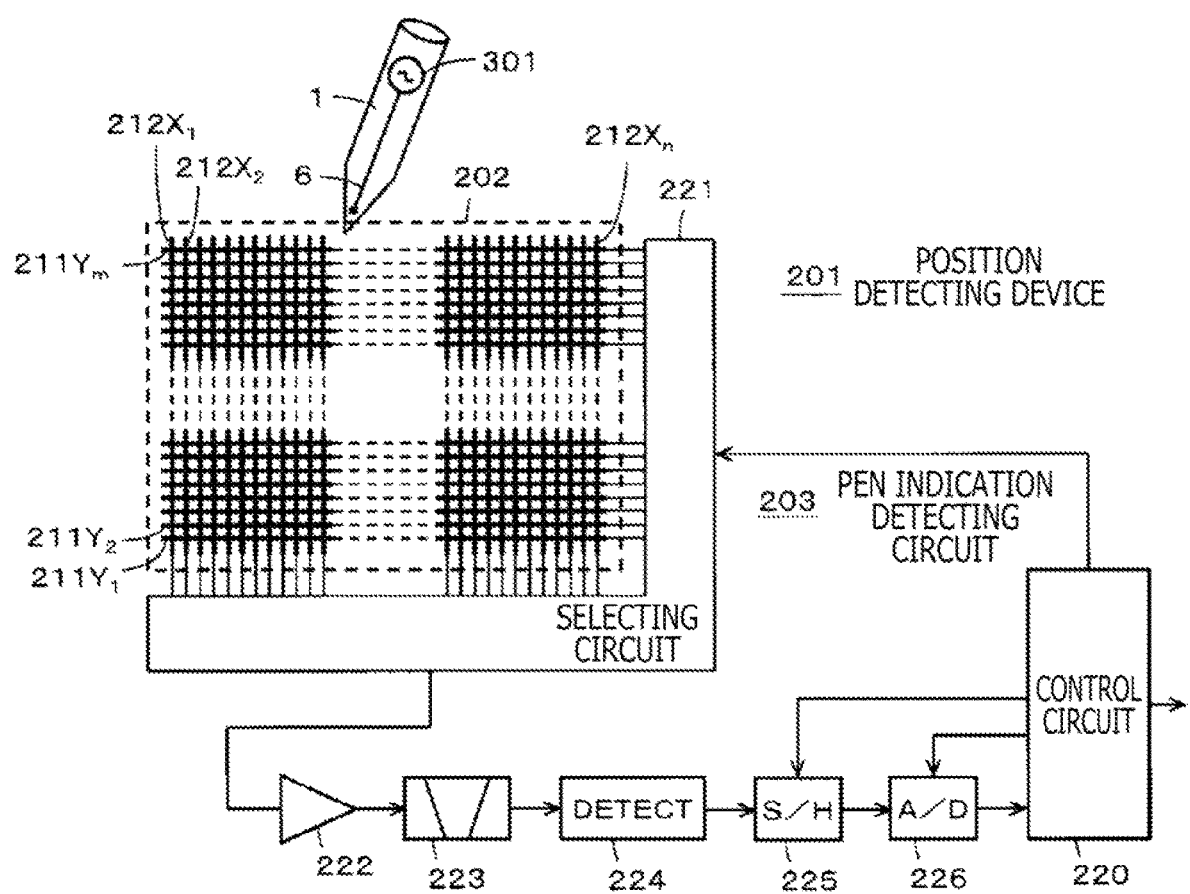
FIG. 5 is a diagram illustrating an example of configuration of a position detecting device used in conjunction with the position indicator according to the first embodiment of the present disclosure.

As illustrated in FIG. 5, a position detecting device 201 according to the present embodiment is constituted of a sensor 202 constituting the position detecting device 201 and a pen indication detecting circuit 203 connected to the sensor 202.

Though a sectional view of the sensor 202 is omitted, the sensor 202 in the example is formed by laminating a first conductor group 211, an insulating layer (not illustrated), and a second conductor group 212 in order from a lower layer side. The first conductor group 211 is, for example, formed by arranging, in a Y-axis direction, a plurality of first parallel conductors $211Y_1$, $211Y_2$, . . . , $211Y_m$ (m is an integer of 1 or more) extending in a horizontal direction (X-axis direction) so as to be separated from each other at predetermined intervals.

In addition, the second conductor group 212 is formed by arranging, in the X-axis direction, a plurality of second parallel conductors $212X_1$, $212X_2$, . . . , $212X_n$ (n is an integer of 1 or more) extending in a direction intersecting the extending direction of the first conductors $211Y_1$, $211Y_2$, . . . , $211Y_m$, or a vertical direction (Y-axis direction) orthogonal to the extending direction of the first conductors $211Y_1$, $211Y_2$, . . . , $211Y_m$ in the present example, so as to be separated from each other at predetermined intervals.

The sensor 202 of the position detecting device 201 thus has a configuration for detecting a position indicated by the position indicator 1, by using a sensor pattern formed by making the first conductor group 211 and the second conductor group 212 intersect each other.

Incidentally, in the following description, when each of the first conductors $211Y_1$, $211Y_2$, . . . , $211Y_m$ does not need to be distinguished, the conductor will be referred to as a first conductor 211Y. Similarly, when each of the second conductors $212X_1$, $212X_2$, . . . , $212X_n$ does not need to be distinguished, the conductor will be referred to as a second conductor 212X.

In the position detecting device 201 according to the present embodiment, the sensor 202 includes a sensor surface (indication input surface) 200 having a size corresponding to the size of a display screen of an electronic apparatus such as, for example, a tablet type information terminal or the like, and is formed by the first conductor group 211 and the second conductor group 212 having optical transparency.

Incidentally, the first conductor group 211 and the second conductor group 212 may be of a configuration in which each of the first conductor group 211 and the second conductor group 212 is disposed on the same surface side of the sensor substrate, or may be of a configuration in which the first conductor group 211 is disposed on one surface side of the sensor substrate and the second conductor group 212 is disposed on another surface side.

The pen indication detecting circuit 203 includes a selecting circuit 221 as an input-output interface with the sensor 202, an amplifier circuit 222, a band-pass filter 223, a detecting circuit 224, a sample and hold circuit 225, an AD (Analog to Digital) converting circuit 226, and a control circuit 220.

The selecting circuit 221 selects one conductor from among each of the first conductor group 211 and the second conductor group 212 on the basis of a control signal from the control circuit 220. The conductors selected by the selecting circuit 221 are connected to the amplifier circuit 222. A signal from the position indicator 1 is detected by the selected conductors, and amplified by the amplifier circuit 222. The output of the amplifier circuit 222 is supplied to the band-pass filter 223, so that only a component having the frequency of the signal transmitted from the position indicator 1 is extracted.

The output signal of the band-pass filter 223 is detected by the detecting circuit 224. The output signal of the detecting circuit 224 is supplied to the sample and hold circuit 225 to be sampled and held in predetermined timing by a sampling signal from the control circuit 220, and thereafter converted into a digital value by the AD converting circuit 226. Digital data from the AD converting circuit 226 is read and processed by the control circuit 220.

The control circuit 220 operates so as to send out a control signal to each of the sample and hold circuit 225, the AD converting circuit 226, and the selecting circuit 221 according to a program stored in an internal ROM of the control circuit 220. In addition, the control circuit 220 calculates position coordinates on the sensor 202, which position coordinates are indicated by the position indicator 1, from the digital data from the AD converting circuit 226, and outputs data on the position coordinates to another processing processor or the like within the electronic apparatus such as, for example, a tablet type information terminal or the like.

In addition, the control circuit 220 of the position detecting device 201 detects, as signals from the position indicator 1, a signal in the state in which the core body main body portion 61 of the core body 6 is electrostatically shielded and a signal in the state in which the electrostatic shielding of the core body main body portion 61 of the core body 6 is cleared, as described above. Then, information based on a distance between positions at which peak values of the received signals in those two detected states, respectively, are exhibited is detected, and the inclination angle of the core body 6 of the position indicator 1 with respect to the sensor surface 200 is calculated on the basis of the detected information on the distance.

In this case, the control circuit 220 of the position detecting device 201 has a correspondence table of data on the distance between the positions at which the peak values of the received signals in the two states, respectively, are exhibited, and data on the inclination angle of the axial direction of the core body 6 of the position indicator 1 with respect to the sensor surface 200. The control circuit 220 of the position detecting device 201 detects information on the inclination angle of the axial direction of the core body 6 of the position indicator 1 with respect to the sensor surface 200 by detecting the information on the distance between the positions at which the peak values of the received signals in the two states, respectively, are exhibited, and by referring to the correspondence table.

Incidentally, it is needless to say that the control circuit 220 of the position detecting device 201 may not have the correspondence table as described above, but may calculate the information on the inclination angle of the core body 6 of the position indicator 1 by calculation from the detected information on the distance between the positions at which the peak values of the received signals in the two states, respectively, are exhibited.

[Signal Transmission Control of Position Indicator 1 for Detecting Inclination Angle of Axial Direction of Core Body 6]

In order to be able to detect the inclination angle of the axial direction of the core body 6 of the position indicator 1 with respect to the sensor surface as described with reference to FIG. 3 and FIGS. 4A and 4B, the position detecting device 201 needs to detect in which of the two states a received signal from the position indicator 1 is, the two states being the state in which the core body 6 is electrostatically shielded by the shielding member 7 in the position indicator 1 and the state in which the electrostatic shielding of the core body 6 by the shielding member 7 is cleared.

In the present embodiment, the position detecting device 201 detects in which of the two states the received signal is on the basis of the signal from the position indicator 1. Therefore, in the present embodiment, the controller 301 of the signal transmission control circuit 30 of the position indicator 1 performs control to transmit a signal such that the position detecting device 201 can perform the detection.

<First Example of Signal Transmission Control>

A first example of a signal transmission control method performed by the controller 301 of the signal transmission control circuit 30 of the position indicator 1 will be described with reference to FIG. 6. Incidentally, it is needless to say that the following signal transmission control method is performed in a state in which the power switch Psw is on and thus the voltage of the battery 4 is supplied to the oscillating circuit 302 and other circuits.

FIG. 6 is a timing diagram of assistance in explaining a first example of the signal transmission control method performed by the controller 301. In the present example, the controller 301 performs enable control of the oscillating circuit 302 by the enable signal CT (see portion (A) of FIG. 6), and thereby performs control so as to make a signal SB output from the oscillating circuit 302 as illustrated in portion (D) of FIG. 6, which signal repeats, in cycles Ta, a signal constituted of a signal for position detection, which signal is formed by a burst signal having a predetermined time length, a start signal ST, shield state information SH, and digital additional data such as pen pressure data or the like, as illustrated in portions (B) and (C) of FIG. 6.

Specifically, the enable signal CT from the controller 301 maintains a high level during a predetermined period from a start of a cycle Ta, as illustrated in portion (A) of FIG. 6. In this predetermined period, a signal for position detection, which signal is formed by a burst signal, is output from the oscillating circuit 302, as illustrated in portions (B) and (C) of FIG. 6. This signal for position detection is transmitted to the sensor 202 of the position detecting device 201 through the core body main body portion 61 of the core body 6.

The length of the transmission period of the signal for position detection is a time length in which the pen indication detecting circuit 203 of the position detecting device 201 can detect a position indicated on the sensor 202 by the position indicator 1. The length of the transmission period of the signal for position detection is, for example, a time length in which all of the first conductors 211Y and the second conductors 212X of the sensor 202 can be scanned once or more, preferably a plurality of times or more.

During the transmission period of the signal for position detection, the controller 301 of the position indicator 1 detects a pen pressure applied to the core body 6 as a detection signal according to the capacitance of the variable capacitance capacitor 5C formed by the pen pressure detector 5, and obtains the pen pressure as a 10-bit value (binary code), for example, from the detection signal.

Then, as illustrated in portions (A) to (C) of FIG. 6, after the transmission period of the signal for position detection is ended, the controller 301 of the signal transmission control circuit 30 of the position indicator 1 sets a transmission period for additional data such as pen pressure data or the like, and performs ASK modulation of the signal output from the oscillating circuit 302 by controlling the enable signal CT (portion (A) of FIG. 6) to a high level or a low level in a predetermined cycle td (td<Ta). The predetermined cycle td corresponds to a transmission interval for 1 bit of transmission data (digital data).

In this case, as illustrated in portions (A) and (B) of FIG. 6, when transmission data (binary code) is "0," the enable signal CT is set at the low level and the oscillating signal from the oscillating circuit 302 is not output. When the transmission data (binary code) is "1," the enable signal CT is set at the high level as illustrated in portion (A) of FIG. 6 in a cycle td, and the oscillating signal from the oscillating circuit 302 is controlled to be sent out.

In a first cycle td of the transmission period of the additional data, the transmission data is always set to "1," which is used as a start signal ST of the transmission period of the additional data, as illustrated in portion (C) of FIG. 6. The start signal ST is a timing signal for enabling data sending-out timing of the following additional information to be accurately determined on the position detecting device 201 side. Incidentally, in place of the start signal ST, an end time point of the signal for position detection can also be used as the timing signal.

The controller 301 controls the enable signal CT (portion (A) of FIG. 6) supplied to the oscillating circuit 302 so as to send out the shield state information SH in a next cycle td following the start signal ST. The shield state information SH is information for notifying, to the position detecting device side, timing of a state in which a signal is sent out in the state in which electrostatic shielding of the core body 6 by the shielding member 7 is performed, and a state in which a signal is sent out in the state in which the electrostatic shielding of the core body 6 by the shielding member 7 is cleared.

In the example, the shield state information SH indicates whether the sending out of the signal, in a cycle T next to a cycle T in which the shield state information SH is included, is performed in the state in which the electrostatic shielding of the core body 6 by the shielding member 7 is performed or in the state in which the electrostatic shielding of the core body 6 by the shielding member 7 is cleared. The controller 301 generates the switching control signal SW (see portion (E) of FIG. 6) so as to switch the switch circuit 303 in each cycle T in correspondence with the shield state information SH.

Specifically, in the example of FIG. 6, in a cycle T next to a cycle T in which the shield state information SH is "1," the controller 301 performs control so as to switch the switch circuit 303 to the fixed terminal b side by setting the switching control signal SW (see portion (E) of FIG. 6) to the low level, and thus sets the state in which the electrostatic shielding of the core body main body portion 61 of the core body 6 is cleared (shield-off state). In addition, in a cycle T next to a cycle T in which the shield state information SH is "0," the controller 301 performs control so as to switch the switch circuit 303 to the fixed terminal c side by setting the switching control signal SW (see portion (E) of FIG. 6) to the high level, and thus sets the state in which the electrostatic shielding of the core body main body portion 61 of the core body 6 is performed (shield-on state).

Following the shield state information SH, the controller 301 controls the enable signal CT so as to sequentially transmit the pen pressure data of 10 bits to the sensor 202 of the position detecting device 201. Portions (A) and (B) of FIG. 6 represent a case where the pen pressure data to be transmitted is "0101110101." Incidentally, following the pen pressure data, the position indicator 1 may send out identification information of the position indicator 1 itself and data on a battery remaining capacity or the like as an ASK signal or an OOK (On Off Keying) signal as in the foregoing.

The oscillating circuit 302 of the signal transmission control circuit 30 of the position indicator 1 repeatedly sends out the signal in the cycle Ta including the transmission period of the signal for position detection and the transmission period of the additional information formed by digital data as described above, as illustrated in portion (D) of FIG. 6 on the basis of control of the controller 301. In addition, the controller 301 alternately switches the movable terminal a of the switch circuit 303 to the fixed terminal b or the fixed terminal c in each cycle Ta by the switching control signal SW (see portion (E) of FIG. 6). The position indicator 1 thereby repeats, in each cycle Ta, the state in which the core body main body portion 61 of the core body 6 is electrostatically shielded by the shielding member 7 and the state in which the electrostatic shielding is cleared.

Incidentally, the controller 301 can detect whether or not a pen pressure is applied to the core body 6 of the position indicator 1 by detecting the capacitance of the variable capacitance capacitor 5C formed by the pen pressure detector 5 as described above. That is, the controller 301 can detect whether or not the tip portion of the core body 6 of the position indicator 1 has touched the sensor surface 200 of the sensor 202 of the position detecting device 201. Accordingly, in the present embodiment, when the controller 301 of the position indicator 1 determines from the value of the capacitance of the variable capacitance capacitor 5C that no pen pressure is applied to the core body 6, the controller 301 controls the oscillating circuit 302 so as not to send out the signal for position detection nor the additional information, or so as to send out the signal for position detection but not to send out the additional information, and does not perform switching control of the switch circuit 303 in each cycle Ta by performing control so as to connect the movable terminal a of the switch circuit 303 to the fixed terminal c at all times.

When the controller 301 determines from the value of the capacitance of the variable capacitance capacitor 5C that a pen pressure is applied to the core body 6, the controller 301 controls the oscillating circuit 302 so as to send out the signal for position detection and the additional information, and performs switching control of the switch circuit 303 by alternately switching the movable terminal a of the switch circuit 303 to the fixed terminal b and the fixed terminal c in each cycle Ta.

Incidentally, without performing such control according to a result of the detection of the pen pressure, the controller 301 may of course always send out a signal as in portion (D) of FIG. 6 and perform the control of switching the switch circuit 303 in each cycle Ta as illustrated in portion (E) of FIG. 6 while the power of the battery 4 is on.

The position detecting device receives the signal from the position indicator 1 by the sensor 202, and performs reception processing as described in the following.

In the pen indication detecting circuit 203 of the position detecting device 201, the control circuit 220, for example, first supplies a selecting signal for sequentially selecting the second conductors $212X_1$ to $212X_n$ to the selecting circuit 221, and reads, as a signal level, data output from the AD converting circuit 226 at a time of selection of each of the second conductors $212X_1$ to $212X_n$. Then, when the signal levels of all of the second conductors $212X_1$ to $212X_n$ do not reach a predetermined value, the control circuit 220 determines that the position indicator 1 is not on the sensor 202, and repeats the control of sequentially selecting the second conductors $212X_1$ to $212X_n$.

When a signal having a level equal to or higher than the predetermined value is detected from one of the second conductors $212X_1$ to $212X_n$, the control circuit 220 stores the number of a second conductor 212X from which a highest signal level (peak value; the same applies hereinafter) is detected, and a plurality of second conductors 212X in the vicinity thereof. Then, the control circuit 220 sequentially selects the first conductors $211Y_1$ to $211Y_m$ by controlling the selecting circuit 221, and reads signal levels from the AD converting circuit 226. At this time, the control circuit 220 stores the numbers of a first conductor 211Y from which a highest signal level is detected, and a plurality of first conductors 211Y in the vicinity thereof.

Then, the control circuit 220 detects a position on the sensor 202, which position is indicated by the position indicator 1 from the number of the second conductor 212X from which the highest signal level is detected, and the number of the first conductor 211Y from which the highest signal level is detected, and the plurality of second conductors 212X in the vicinity of the second conductor 212X from which the highest signal level is detected, and the plurality of first conductors 211Y in the vicinity of the first conductor 211Y from which the highest signal level is detected, the numbers being stored as described above.

After the control circuit 220 selects a last first conductor $211Y_m$ by the selecting circuit 221 and completes detecting a signal level, the control circuit 220 waits for an end of the transmission period of the signal for position detection from the position indicator 1. After the control circuit 220 detects the start signal ST after an end of the transmission period of the signal for position detection, the control circuit 220 performs an operation of reading data such as pen pressure data or the like, and reconstructing a digital signal.

In addition, the control circuit 220 detects the shield state information SH following the detection of the start signal ST, and determines whether the shield state information SH is "1" or "0." On the basis of a result of the determination, the control circuit 220 detects a received signal in the state in which the core body 6 of the position indicator 1 is electrostatically shielded and a received signal level in the state in which the electrostatic shielding is cleared. The control circuit 220 detects the inclination angle of the core body 6 of the position indicator 1 from the positions of peak values of both the received signals. The control circuit 220 then repeats the above operation.

Incidentally, in the above first example, the additional information is transmitted also in the period of the state in which the switching control signal SW of the switch circuit 303 is set to the low level and thus the electrostatic shielding of the core body 6 is cleared. However, the additional information may not be transmitted in the period of the state in which the electrostatic shielding of the core body 6 is cleared.

In addition, in the above first example, the controller 301 sets the entire period of one cycle Ta as the period of the state in which the switching control signal SW of the switch circuit 303 is set at the low level and thus the electrostatic shielding of the core body 6 is cleared, and alternately produces the state in which the electrostatic shielding is performed and the state in which the electrostatic shielding is cleared. However, as illustrated in portion (F) of FIG. 6, the electrostatic shielding of the core body 6 may be cleared by setting the switching control signal SW of the switch circuit 303 at the low level in correspondence with the transmission interval of the signal for position detection, and the electrostatic shielding may be performed by setting the switching control signal SW of the switch circuit 303 at the high level in correspondence with the transmission period of the additional information. Consequently, during the transmission period of the additional information, the core body 6 is electrostatically shielded at all times, and therefore the transmission signal is sent out only from the tip portion side of the core body 6. Thus, the position detecting device 201 can detect the additional information well within each period Ta.

Incidentally, while the state of the electrostatic shielding of the core body 6 in the transmission period after one cycle Ta is notified to the position detecting device 201 by the shield state information SH in the above-described first example, the state of the electrostatic shielding of the core body 6 in an immediately preceding transmission period of the signal for position detection may be notified to the position detecting device 201 by the shield state information SH.

<Second Example of Signal Transmission Control>

A second example of the signal transmission control method performed by the controller 301 of the signal transmission control circuit 30 of the position indicator 1 will be described with reference to FIG. 7.

FIG. 7 is a timing diagram of assistance in explaining the second example of the signal transmission control method performed by the controller 301. In the above-described first example, the shield state information SH is transmitted from the position indicator 1 to the position detecting device 201 in order to notify the electrostatic shielding state. The second example is an example in which information for notifying the electrostatic shielding state such as the shield state information SH in the first example does not need to be sent.

In the present example, the controller 301 performs enable control of the oscillating circuit 302 by the enable signal CT (see portion (A) of FIG. 7), and thereby performs control so as to make a signal SB output from the oscillating circuit 302 as illustrated in portion (D) of FIG. 7, which signal repeats, in cycles Tb, a signal constituted of a signal for position detection, which signal is formed by a burst signal having a predetermined time length, a start signal ST, and digital additional data such as pen pressure data or the like, as illustrated in portions (B) and (C) of FIG. 7.

In the second example, as illustrated in portion (C) of FIG. 7, the shield state information SH is not included in the transmission period of the additional information. Instead, in the second example, as illustrated in portions (A) to (C) of FIG. 7, the length of a transmission period Ps of a signal for position detection is, for example, set to twice the length of the first example. Then, as illustrated in portions (D) and (E) of FIG. 7, the transmission period Ps of the signal for position detection is divided into two parts, and control is performed so as to perform the electrostatic shielding of the core body 6 by the shielding member 7 in the first half period of Ps/2, and clear the electrostatic shielding of the core body 6 by the shielding member 7 in the second half period of Ps/2.

That is, as illustrated in portion (E) of FIG. 7, the controller 301 generates a switching control signal SW that performs control so as to clear the electrostatic shielding of the core body 6 by the shielding member 7, by switching the movable terminal a of the switch circuit 303 to the fixed terminal b in only the second half period of Ps/2 of the transmission period of the signal for position detection within the period of each cycle Tb, and perform the electrostatic shielding of the core body 6 by the shielding member 7 by switching the movable terminal a to the fixed terminal c in other periods. The controller 301 supplies the switching control signal SW to the switch circuit 303. The other configuration is similar to that of the first example.

In the second example, the control circuit 220 of the position detecting device 201 detects an end of the transmission period of the signal for position detection or the start signal ST, and thereby detects a start time point of the transmission period Ps of a next signal for position detection. Then, the control circuit 220 detects a signal in the state in which the electrostatic shield of the core body 6 by the shielding member 7 is performed as a received signal from the position indicator 1 in the first half period of Ps/2 of the transmission period Ps of the signal for position detection, and detects a signal in the state in which the electrostatic shielding of the core body 6 by the shielding member 7 is cleared as a received signal from the position indicator 1 in the second half period of Ps/2. The control circuit 220 then detects the inclination angle of the core body 6 of the position indicator 1 as described above from the signals received in those two periods.

Incidentally, in the example of FIG. 7, as illustrated in portion (E) of FIG. 7, the core body 6 is electrostatically shielded by the shielding member 7 in the first half period of Ps/2 of the transmission period Ps of the signal for position detection, and the electrostatic shielding of the core body 6 by the shielding member 7 is cleared in the second half period of Ps/2. However, as illustrated in portion (F) of FIG. 7, by control of the controller 301, the electrostatic shielding of the core body 6 by the shielding member 7 may be performed in correspondence with the transmission period Ps of the signal for position detection, and the electrostatic shielding of the core body 6 by the shielding member 7 may be cleared in correspondence with the transmission of the additional information such as pen pressure data or the like following the transmission of the signal for position detection.

Second Embodiment

In the position indicator 1 according to the foregoing first embodiment, the shielding member 7 is formed by using a tubular conductor 71. However, the shielding member is not limited to such a tubular conductor. In a position indicator 1A according to a second embodiment to be described in the following, the shielding member is formed by a coil that houses a core body within a winding space of the coil. In the position indicator 1A according to the second embodiment, the shielding member is formed by the coil, and the coil is used also as an induction coil for performing electromagnetic induction type charging. Hence, the position indicator 1A according to the second embodiment does not include a battery, but instead includes a storage element, which is, for example, a capacitor such as an electric double layer capacitor or the like, a rechargeable storage battery, or the like.

In addition, in the first embodiment, information for enabling the position detecting device side to recognize the state in which the core body is electrostatically shielded by the shielding member in the position indicator and the state in which the electrostatic shielding of the core body is cleared is notified from the position indicator to the position detecting device side. On the other hand, in the second embodiment, instead of transmitting the information for notifying the state of electrostatic shielding of the core body from the position indicator 1A to the position detecting device side, an inclination angle detection request signal transmitted from the position detecting device is received, and in response to the received inclination angle detection request signal (hereinafter referred to simply as a request signal for short), the position indicator 1A performs, in a predetermined sequence, signal transmission in the state in which the core body is electrostatically shielded by the shielding member and signal transmission in the state in which the electrostatic shielding of the core body by the shielding member is cleared.

FIGS. 8A and 8B are diagrams of assistance in explaining a core body 6A and a shielding member 7A of the position indicator 1A according to the second embodiment. FIG. 8A is an exploded perspective view of the part of the core body 6A, the shielding member 7A, and a pen pressure detector 5A. FIG. 8B is a fragmentary enlarged view of the pen tip side of the position indicator 1A with a casing 2 illustrated in section. In the position indicator 1A to be described in the following, the reference numerals of parts corresponding to those of the position indicator 1 according to the first embodiment are illustrated by adding a suffix A to the same numbers.

In the position indicator 1A according to the second embodiment, the core body 6A, for example, has a constitution of a conductive metallic rod or a rod-shaped body made of a hard resin mixed with conductive powder. The shielding member 7A is formed by winding a coil 75 formed by winding a conductor around, for example, a cylindrical-shaped magnetic core, or a ferrite core 76 in the example. As illustrated in FIG. 8B, an end portion of the ferrite core 76, which end portion is on an opposite side from a pen tip side in the axial direction of the ferrite core 76, is fitted into a fitting recessed portion 51Aa of a housing member 51A internally housing the pen pressure detector 5A.

A through hole 76a penetrating in the axial direction is formed in the ferrite core 76. The inside diameter r of the through hole 76a is selected to be a value slightly larger than the outside diameter of the core body 6A. The core body 6A is inserted through the through hole 76a of the ferrite core 76. Then, as illustrated in FIG. 8B, an end portion 6Ab of the core body 6A, which end portion is on an opposite side from a tip portion 6Aa of the core body 6A, is fitted into the pen pressure detector 5A provided within the housing member 51A.

In a state in which the core body 6A is fitted to the pen pressure detector 5A, the tip portion 6Aa side of the core body 6A protrudes from the ferrite core 76. When a user applies a force so as to pull out the core body 6A, the fitting between the core body 6A and a fitting portion of the pen pressure detector 5A is easily released, and the core body 6A can be pulled out. That is, the core body 6A is replaceable. The pen pressure detector 5A has a configuration similar to that of the pen pressure detector 5 of the position indicator 1 according to the foregoing first embodiment.

In the present example, a printed circuit board 3A is attached within the housing member 51A. An electronic circuit formed on the printed circuit board 3A is electrically connected to both terminals of a variable capacitance capacitor 5AC constituting the pen pressure detector 5A, and one terminal 75a and another terminal 75b of the coil 75 are also electrically connected to the electronic circuit on the printed circuit board 3A.

As illustrated in FIG. 8B, the position indicator 1A according to the second embodiment has a conductor sleeve 23 at a pen tip portion of an insulator portion 21A of a casing 2A, the conductor sleeve 23 being provided as a configuration for receiving an instruction signal from the position detecting device. The conductor sleeve 23 has a tubular cap-like shape covering the pen tip portion of the insulator portion 21A of the casing 2A. The conductor sleeve 23 is electrically insulated from a conductor portion (not illustrated in FIGS. 8A and 8B of the casing 2A. The conductor sleeve 23 is capable of receiving a signal from the sensor of the position detecting device by electrostatic coupling.

Though not illustrated, the conductor sleeve 23 is electrically connected to the electronic circuit on the printed circuit board 3A.

[Description of Example of Constitution of Signal Transmission Control Circuit 30A of Position Indicator 1A according to Second Embodiment]

Figure 9:
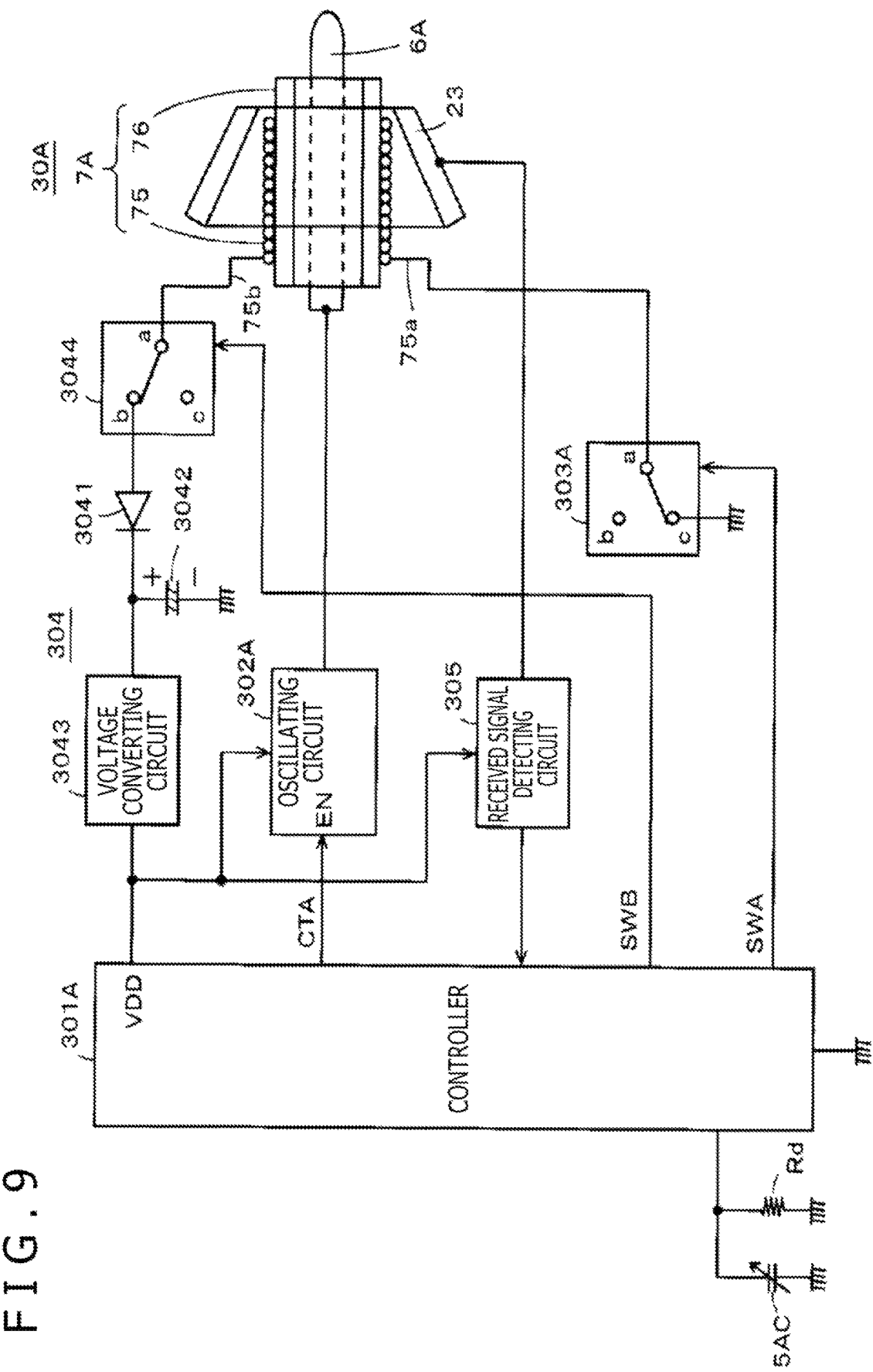
FIG. 9 is a diagram illustrating an example of constitution of a signal transmission control circuit of the position indicator according to the second embodiment of the present disclosure.

FIG. 9 is a diagram illustrating an example of constitution of a signal transmission control circuit 30A of the position indicator 1A according to the second embodiment. The signal transmission control circuit 30A in the present example includes a controller 301A, an oscillating circuit 302A, a switch circuit 303A, a switch circuit 3044, a charging type power supply circuit 304, and a received signal detecting circuit 305.

The controller 301A is formed by a microprocessor as with the controller 301. The controller 301A constitutes a control circuit that controls processing operation of the signal transmission control circuit 30A of the position indicator 1A. In the present example, a power supply voltage VDD from the power supply circuit 304 is supplied as a driving power to the controller 301A. The controller 301A controls the oscillating circuit 302A, and performs switching control of the switch circuit 303A and the switch circuit 3044.

In addition, the controller 301A is connected with the variable capacitance capacitor 5AC constituting the pen pressure detector 5A. As with the controller 301 in the first embodiment, the controller 301A detects the capacitance of the variable capacitance capacitor 5AC by measuring a time taken for the variable capacitance capacitor 5AC to reach a predetermined voltage across the variable capacitance capacitor 5AC by discharging through a resistor Rd from a fully charged state, and detects a pen pressure from the detected capacitance.

As with the oscillating circuit 302, the oscillating circuit 302A generates an alternating-current signal of a frequency f1=1.8 MHz, for example. The oscillating circuit 302A is supplied with the power supply voltage VDD from the power supply circuit 304 in the present example.

As in the case of the foregoing first embodiment, the controller 301A performs on-off control of the oscillating circuit 302A by supplying a control signal (enable signal CTA) to an enable terminal EN of the oscillating circuit 302A. The controller 301A thereby makes a burst signal (signal for position detection) and an ASK modulated signal (additional information) generated from the oscillating circuit 302A, and stops the sending out of the signals.

An output terminal of the oscillating circuit 302A in the present embodiment is connected to the conductive core body 6A. The alternating-current signal from the oscillating circuit 302A is sent out to the sensor of the position detecting device through the core body 6A.

The switch circuit 303A is switching-controlled by a switching control signal SW from the controller 301A. A movable terminal a of the switch circuit 303A is connected to one terminal 75a of the coil 75 constituting the shielding member 7A. One fixed terminal b of the switch circuit 303A is a free end, and another fixed terminal c of the switch circuit 303A is grounded.

The other terminal 75b of the coil 75 constituting the shielding member 7A is connected to a movable terminal a of the switch circuit 3044 switching-controlled by a switching control signal SWB from the controller 301A. One fixed terminal b of the switch circuit 3044 is connected to the anode of a rectifying diode 3041. Another fixed terminal c of the switch circuit 3044 is a free end. The power supply circuit 304 includes the rectifying diode 3041, an electric double layer capacitor 3042, and a voltage converting circuit 3043. One terminal of the electric double layer capacitor 3042 is connected to the cathode of the diode 3041. Another terminal of the electric double layer capacitor 3042 is grounded. Incidentally, the power supply circuit 304 may be of a circuit configuration including a rechargeable storage battery. The controller 301A makes the coil 75 function as an induction coil (wireless power feeding coil) or as an electrostatic shielding member by controlling the switch circuit 303A and the switch circuit 3044 by the switching control signals SWA and SWB. Specifically, when the coil 75 is made to function as a wireless power feeding coil based on an electromagnetic induction system, the controller 301 connects the movable terminal a and the fixed terminal b of the switch circuit 3044 to each other by controlling the switch circuit 3044 by the switching signal SWB, and connects the movable terminal a and the fixed terminal c of the switch circuit 303A to each other by controlling the switch circuit 303A by the switching signal SWA. When the coil 75 is made to function as an electrostatic shielding member, the controller 301 connects the movable terminal a and the fixed terminal c as a free end of the switch circuit 3044 to each other by controlling the switch circuit 3044 by the switching signal SWB. The coil 75 can be made to function as an electrostatic shielding member when the movable terminal a and the fixed terminal c of the switch circuit 303A are connected to each other by the switching signal SWA, in the state in which the movable terminal a and the fixed terminal c as a free end of the switch circuit 3044 are connected to each other. In addition, the function of the coil 75 as an electrostatic shielding member can be cleared when the movable terminal a and the fixed terminal b as a free end of the switch circuit 303A are connected to each other by the switching signal SWA.

The controller 301A monitors output from the received signal detecting circuit 305, and determines whether or not a coupled state enabling electrostatic interaction is set between the position indicator 1A and the sensor on the basis of whether or not the signal level of a received signal from the sensor has become equal to or higher than a predetermined threshold value level. Then, according to a result of the determination, an enable signal CTA that controls the oscillating circuit 302A is controlled, the movable terminal a and the fixed terminal c of the switch circuit 3044 are connected to each other by the switching control signal SWB, and the switch circuit 303A is controlled by the switching control signal SW. The predetermined threshold value at this time is determined in advance on the basis of a received signal level when the coupled state enabling electrostatic interaction is set between the position indicator 1A and the sensor. Incidentally, the coupled state enabling electrostatic interaction between the position indicator 1A and the sensor includes a state in which the tip portion 6Aa of the core body 6A of the position indicator 1A is in proximity to the sensor surface of the sensor without being in contact with the sensor surface of the sensor.

Then, when the coupled state enabling electrostatic interaction is set between the position indicator 1A and the sensor, the controller 301A monitors for reception of a request signal from the position detecting device. The request signal from the position detecting device is received by the conductor sleeve 23 through electrostatic coupling to the sensor, as described above. The request signal from the position detecting device, which request signal is received by the conductor sleeve 23, is supplied to the controller 301A through the received signal detecting circuit 305. The received signal detecting circuit 305 is also supplied with the voltage from the voltage converting circuit 304 as power.

According to whether the request signal from the position detecting device is not received or whether the request signal is received, the controller 301A controls the enable signal CTA that controls the oscillating circuit 302A, and controls the switching control signal SW for the switch circuit 303A, as will be described later.

In this case, when the controller 301A determines that the request signal from the position detecting device is received, the controller 301A controls the oscillating circuit 302A so as to send out a signal from the core body 6A, and controls the switch circuit 303A so as to switch between two states, that is, a state in which the core body 6A is electrostatically shielded by the shielding member 7A and a state in which the electrostatic shielding of the core body 6A by the shielding member 7A is cleared, as in the position indicator 1 according to the foregoing first embodiment.

The mode of the signal sent out from the core body 6A at this time may be the mode of signal transmission control in the first example of the foregoing first embodiment, or may be the mode of signal transmission control in the second example. In the case where the first example is used, the signal in the above-described mode can be sent out from the position indicator 1A to the sensor of the position detecting device in timing determined on the basis of the request signal. Thus, the shield state information SH does not need to be included in the signal sent out from the core body 6A.

In addition, the signal in the two states may not necessarily use the modes of signal transmission control in the first example and the second example described above. For example, only a signal for position detection, which signal does not include additional information such as pen pressure information or the like, may be transmitted in the two states.

As will be described later, when the coupled state enabling electrostatic interaction is not set between the position indicator 1A and the sensor, the controller 301A connects the movable terminal a of the switch circuit 3044 to the fixed terminal b by the switching control signal SWB, and grounds the coil 75 through the switch circuit 303A by connecting the movable terminal a of the switch circuit 303A to the fixed terminal c by the switching control signal SW.

When the position indicator 1A is mounted on a charger not illustrated in the figure, which charger performs charging by an electromagnetic induction system in this state, an induced electromotive force is generated in the coil 75 by an alternating magnetic field produced by the charger, and charges the electric double layer capacitor 3042 as a charger via the diode 3041.

The voltage converting circuit 3043 converts a voltage stored in the electric double layer capacitor 3042 into a certain voltage, and supplies the voltage as power to the controller 301A, the oscillating circuit 302A, and the received signal detecting circuit 305. The voltage converting circuit 3043 may be a step-down type such as makes the voltage lower than the voltage across the electric double layer capacitor 3042, or may be a step-up type such as makes the voltage higher than the voltage across the electric double layer capacitor 3042. In addition, the voltage converting circuit 3043 may be a step-up/step-down type that operates as a step-down circuit when the voltage across the electric double layer capacitor 3042 is higher than a certain voltage, and operates as a step-up circuit when the voltage across the electric double layer capacitor 3042 is lower than the certain voltage.

Figure 10:
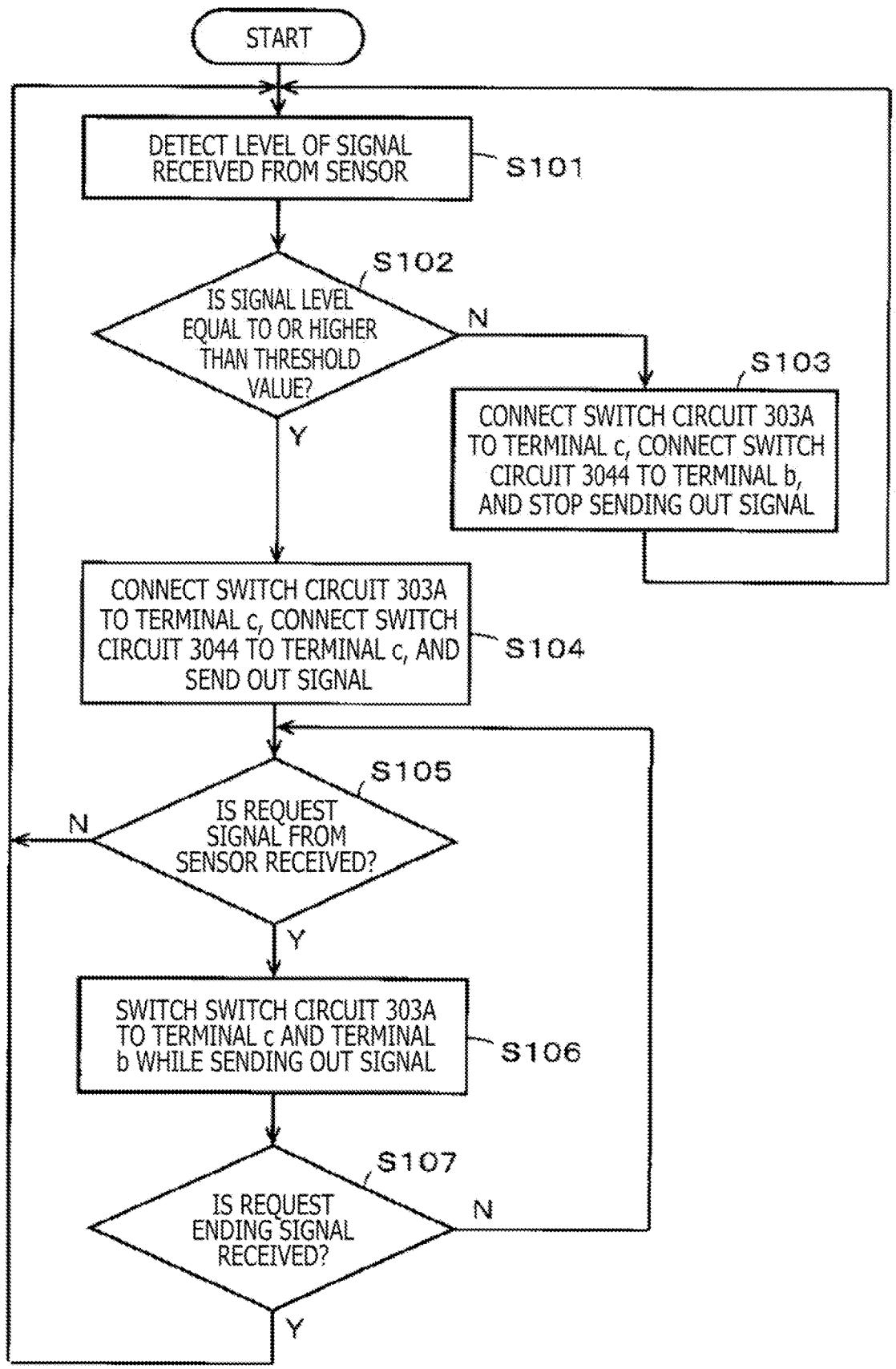
FIG. 10 is a flowchart of assistance in explaining operation of parts of the position indicator according to the second embodiment of the present disclosure.

Next, referring to a flowchart of FIG. 10, description will be made of a flow of control processing of the controller 301A of the signal transmission control circuit 30A of the position indicator 1A according to the second embodiment.

The controller 301A detects the signal level of a received signal from the sensor, which received signal is detected by the received signal detecting circuit 305 (S101), and determines whether or not the detected signal level of the received signal is equal to or higher than a predetermined threshold value (S102).

When the controller 301A determines at S102 that the detected signal level of the received signal is not equal to or higher than the predetermined threshold value, the controller 301A determines that the coupled state enabling electrostatic interaction is not set between the position indicator 1A and the sensor, and performs control so as to stop sending out a signal from the oscillating circuit 302A by the enable signal CTA, and connects the switch circuit 3044 to the fixed terminal b by the switching control signal SWB, and controls the switch circuit 303A so as to connect the movable terminal a to the fixed terminal c by the switching control signal SW (S103). In this state, the coil 75 is grounded through the switch circuit 303A. Thus, the electric double layer capacitor 3042 can be charged and made to store electricity by mounting the position indicator 1A on the charging device.

When the controller 301A determines at S102 that the detected signal level of the received signal is equal to or higher than the predetermined threshold value, the controller 301A determines that the coupled state enabling electrostatic interaction is set between the position indicator 1A and the sensor, connects the movable terminal a of the switch circuit 3044 to the fixed terminal c by the switching control signal SWB, and performs control so as to send out a signal from the oscillating circuit 302A as described above by the enable signal CTA. The state in which the movable terminal a of the switch circuit 303A is connected to the fixed terminal c is maintained by the switching control signal SW (S104).

Next, the controller 301A determines whether or not a request signal is received by monitoring the received signal from the sensor, which received signal is detected by the received signal detecting circuit 305 (S105). When the controller 301A determines at S105 that the request signal is not received, the controller 301A returns the processing to S101, and repeats the processing from S101 on down.

When the controller 301A determines at S105 that the request signal is received, the controller 301A supplies the above-described signal to the sensor of the position detecting device through the core body 6A in two states, that is, the state in which the core body 6A is electrostatically shielded by the shielding member 7A and the state in which the electrostatic shielding of the core body 6A by the shielding member 7A is cleared, as in the position indicator 1 according to the foregoing first embodiment (S106).

Next, the controller 301A determines whether or not a request ending signal is received from the position detecting device (S107). When the controller 301A determines at S107 that the request ending signal is not received from the position detecting device, the controller 301A returns the processing to S105, and repeats the processing from S105 on down. In addition, when the controller 301A determines at S107 that the request ending signal is received from the position detecting device, the controller 301A returns the processing to S101, and repeats the processing from S101 on down.

According to the position indicator 1A in accordance with the foregoing second embodiment, when an inclination angle detection request signal is received from the position detecting device, it suffices to perform a signal sequence so as to produce two states, that is, the state in which the core body 6A is electrostatically shielded by the shielding member 7A and the state in which the electrostatic shielding of the core body 6A by the shielding member 7A is cleared, in response to the received inclination angle detection request signal.

In addition, according to the position indicator 1A in accordance with the foregoing second embodiment, the coil 75 is used as the shielding member 7A for electrostatically shielding the core body 6A, and the coil 75 is used as a coil for noncontact charging. Thus, in addition to the effect of electrostatically shielding the core body 6A, it is possible to realize a position indicator with good operability, which position indicator is capable of noncontact charging by, for example, a charger of a pen stand shape or the like.

[Modifications of Second Embodiment]

In the foregoing second embodiment, the coupled state enabling electrostatic interaction between the position indicator 1A and the sensor is detected on the basis of the signal level of a signal received from the sensor through the conductor sleeve. However, the coupled state may be detected by detecting a state of touching the sensor on the basis of pen pressure detection by the pen pressure detector 5A, as in the first embodiment.

Incidentally, while the conductor sleeve 23 is dedicated to reception, the conductor sleeve 23 can also be used for transmission of the signal from the oscillating circuit 302A. Specifically, in that case, the circuit is configured such that the conductor sleeve 23 can be time division controlled in a transmission time interval for performing signal transmission and a reception time interval for receiving a signal from the sensor. Then, a signal is transmitted in the transmission time interval before the coupled state as a state enabling electrostatic interaction between the position indicator and the sensor is detected from the received signal in the reception time interval. A signal from the position indicator can thereby be sent out from the core body and the conductor sleeve. Thus, signal sending-out energy in a so-called hovering state before the position indicator is coupled to the sensor can be increased, and detection of the position of the position indicator in the hovering state becomes relatively easy. Then, after the position indicator and the sensor are set in the coupled state, only the reception time interval is set to monitor the signal from the sensor of the position detecting device at all times, and request signal determination is made.

In addition, in the foregoing second embodiment, description has been made of control performed in response to a request signal from the position detecting device side so as to produce two states as one pair (one set), the two states being a state in which the core body is electrostatically shielded and a state in which the electrostatic shielding is cleared, while a signal is sent out from the core body. However, control may be performed so as to normally send out a signal from the core body in the electrostatically shielded state, and clear the electrostatic shielding when there is a request signal from the position detecting device side. In addition, conversely, control may be performed so as to normally send out a signal from the core body in the state in which the electrostatic shielding is cleared, and perform the electrostatic shielding when there is a request signal from the position detecting device side.

In that case, it suffices for the position detecting device to retain, in advance, the peak value of the received signal from the position indicator, which signal is detected during the normal time, and detect the inclination angle of the axial direction of the core body of the position indicator from a difference between the retained peak value and the peak value of the received signal received after the request signal is sent out.

Incidentally, one terminal 75a of the coil 75 at a time of the electrostatic shielding of the core body 6A of the position indicator 1A by the coil 75 is not limited to a ground potential, but may be a positive side potential of the power supply, or may be a potential intermediate between the positive side potential of the power supply and the ground potential. In short, it suffices to ground one terminal 75a of the coil 75 in terms of alternating current.

In addition, in the foregoing second embodiment, the conductor sleeve 23 formed of a conductor is provided on the pen tip side of the position indicator 1A, and the request signal for detection of the inclination angle of the position indicator 1A (core body 6A) from the position detecting device is received by the conductor sleeve 23 by electrostatic coupling to the sensor. However, the reception of the request signal from the position detecting device in the position indicator 1A is not limited to the present example.

Figure 11:
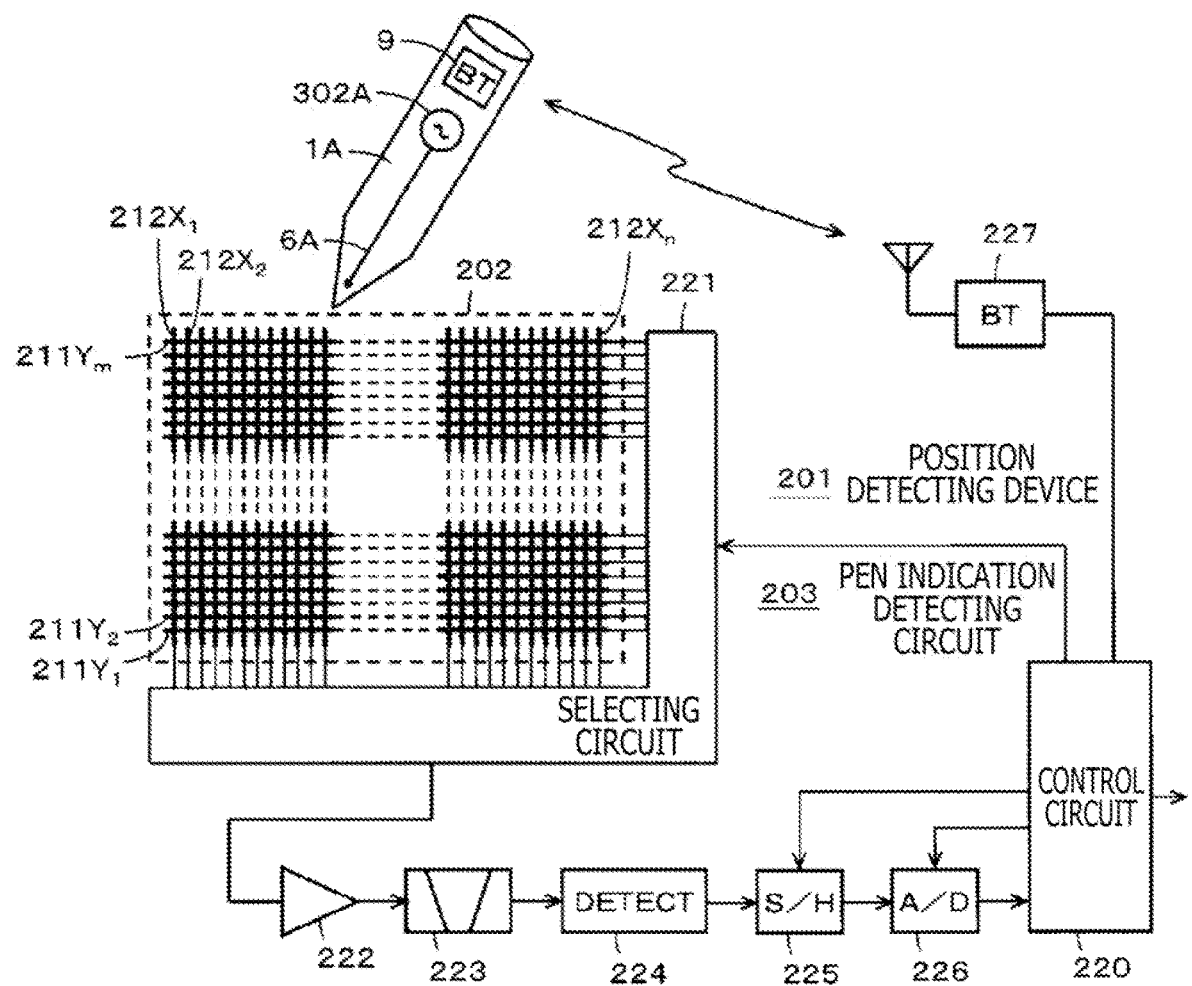
FIG. 11 is a diagram of assistance in explaining a modification of the position indicator according to the second embodiment of the present disclosure.

For example, as illustrated in FIG. 11 in which the same parts as in the position detecting device 201 described with reference to FIG. 5 are identified by the same reference numerals, and description thereof will be omitted, the position indicator 1A is provided with wireless communication means capable of two-way communication, for example, a wireless communication device 9 that communicates according to a Bluetooth (registered trademark) standard, and the position detecting device is also provided with wireless communication means, for example, a wireless communication device 227 that communicates according to the Bluetooth (registered trademark) standard. Then, the control circuit 220 of the position detecting device 201 supplies a request signal to the position indicator 1A through the wireless communicating unit 227, in timing of detecting the inclination angle of the axial direction of the core body 6A of the position indicator 1A.

Then, the position indicator 1A receives the request signal from the position detecting device by the wireless communicating unit 9, and the controller 301A not illustrated in FIG. 11 controls the oscillating circuit 302A as described above.

Incidentally, the wireless communication devices are not limited to wireless communication devices using radio waves as in the example of FIG. 11, but may, for example, be wireless communication units using optical communication by infrared rays or the like, ultrasonic waves, or the like.

Incidentally, when signals for detecting the inclination angle of the core body are sent out from the position indicator side in response to the request signal from the position detecting device, the position indicator in the foregoing second embodiment executes two states, that is, a state in which a signal is sent out in the state in which the core body is electrostatically shielded, and a state in which a signal is sent out in the state in which the electrostatic shielding of the core body is cleared. However, the position indicator may always send out a signal in one of the state in which the core body is electrostatically shielded or the state in which the electrostatic shielding of the core body is cleared while the request signal is not received, and send out a signal in the other of the state in which the core body is electrostatically shielded or the state in which the electrostatic shielding of the core body is cleared when the request signal is received. In this case, the position detecting device can detect the inclination angle of the core body of the position indicator from the received signal before the request signal is sent out, and from the received signal after the request signal is sent out.

Third Embodiment

A third embodiment to be described in the following is an example of a configuration enabling detection of not only the inclination angle of the axial direction of the core body of the position indicator but also rotation of the position indicator.

Figure 12A:
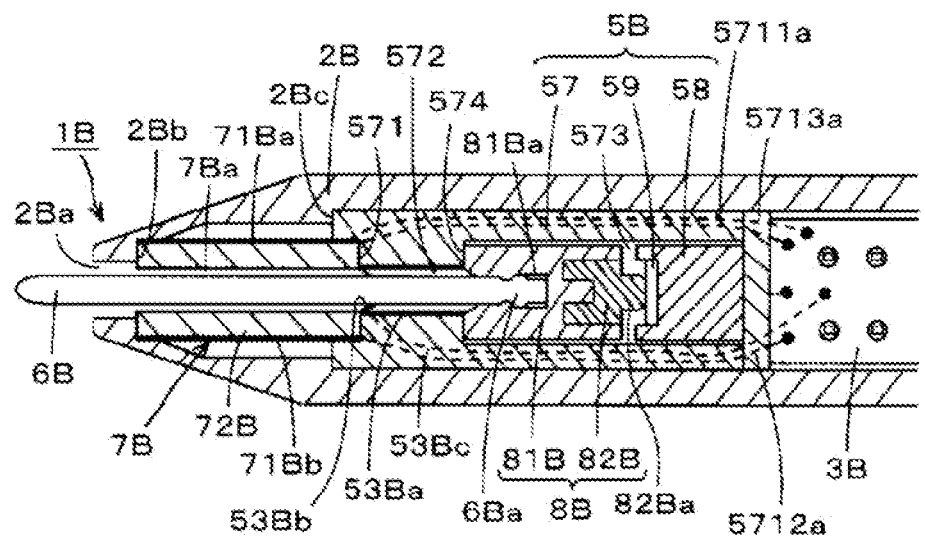
FIGS. 12 A, 12B, and 12C illustrates diagrams of assistance in explaining an example of constitution of parts of a position indicator according to a third embodiment of the present disclosure.
Figure 12B:
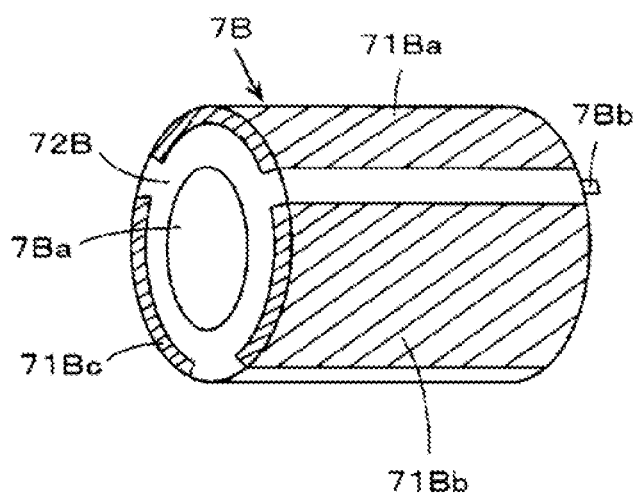
Figure 12C:
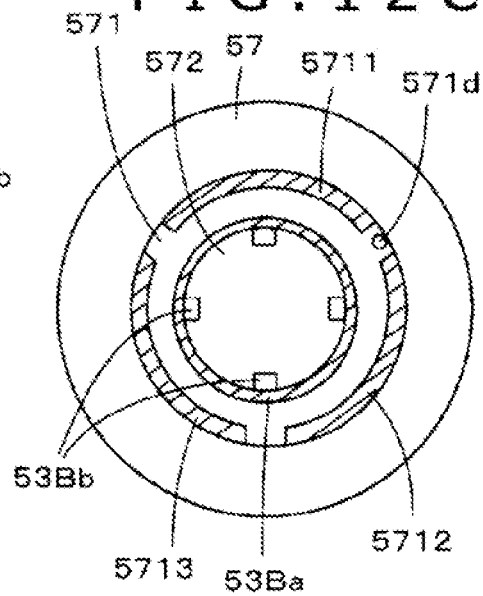

FIG. 12A is an enlarged sectional view of the pen tip side of a position indicator 1B according to the third embodiment. In addition, FIGS. 12B and 12C are diagrams illustrating an example of constitution of parts of the position indicator 1B according to the third embodiment.

As with the core body 6A of the position indicator 1A according to the second embodiment, a core body 6B of the position indicator 1B according to the present third embodiment is formed by a rod-shaped body of a conductor formed of a conductive metal or a conductive resin. As illustrated in FIG. 12A, the position indicator 1B according to the present third embodiment uses a pen pressure detector 5B to detect a pen pressure applied to the core body 6B. As in the first embodiment, the core body 6B is covered by a tubular shielding member 7B except for the pen tip side and the fitting side of the core body 6B, the fitting side being fitted to the pen pressure detector 5B.

The pen pressure detector 5B includes an outside holder 57 and an inside holder 58 formed of a resin, for example, and a pressure sensing device 59.

The outside holder 57 has a through hole 572 through which the core body 6B is inserted and a housing space 573 formed by a hollow portion communicating with the through hole 572. The inside holder 58 and the pressure sensing device 59 disposed in the inside holder 58 are housed within the housing space 573. In addition, a recessed portion 571 having a shape corresponding to the shielding member 7B is provided in an end surface on the pen tip side of the outside holder 57. An end portion of the shielding member 7B, which end portion is on an opposite side from the pen tip side of the shielding member 7B, is fitted and coupled to the inside of the recessed portion 571.

In the position indicator 1B according to the present third embodiment, as illustrated in FIG. 12B, the shielding member 7B is provided with three electrodes 71Ba, 71Bb, and 71Bc in the outer circumferential surface of a tubular body 72B formed of an insulating material, for example, a resin. As illustrated in FIG. 12A, the shielding member 7B is disposed within a casing 2B in a state in which the axial direction of the shielding member 7B and the axial direction of the casing 2B coincide with each other. The shielding member 7B has a through hole 7Ba having a diameter for inserting the core body 6B.

As illustrated in FIG. 12B, the electrodes 71Ba, 71Bb, and 71Bc are constituted by conductive metallic conductors formed so as to be electrically separated from each other in the outer circumferential surface of the tubular body 72B, with each of the metallic conductors in an angle range slightly narrower than an angle range of 120 degrees. That is, the electrodes 71Ba, 71Bb, and 71Bc are equivalent to electrodes obtained by dividing the tubular conductor 71 of the shielding member 7 in the first embodiment into three parts in a circumferential direction. Incidentally, the tubular body 72B formed of a resin as an insulating material corresponds to the insulating layer 72 of the shielding member 7 in the first embodiment.

As illustrated in FIG. 12C, conductor pieces 5711, 5712, and 5713 corresponding to the three electrodes 71Ba, 71Bb, and 71Bc formed in the outer circumferential surface of the tubular body 72B of the shielding member 7B are formed on an inner circumferential surface on the bottom surface side of the recessed portion 571 of the outside holder 57 of the pen pressure detector 5B. In addition, a protrusion 7Bb for alignment is formed on the tubular body 72B of the shielding member 7B, and a recessed hole 571d corresponding to the protrusion 7Bb is formed in the bottom surface of the recessed portion 571, as illustrated in FIG. 12C. When the protrusion 7Bb is fitted into the recessed hole 571d, alignment in the circumferential direction is performed, and the tubular body 72B of the shielding member 7B is housed within the recessed portion 571. Then, the three electrodes 71Ba, 71Bb, and 71Bc formed in the outer circumferential surface of the tubular body 72B of the shielding member 7B and the corresponding conductor pieces 5711, 5712, and 5713 of the recessed portion 571 respectively come into contact with each other, and are thus electrically connected to each other.

As illustrated in FIG. 12A, connecting lines (see dotted lines in FIG. 12A) 5711a, 5712a, and 5713a having one ends connected to the respective conductor pieces 5711, 5712, and 5713 are provided by insert molding within the outside holder 57 formed of a resin. Other ends of the connecting lines 5711a, 5712a, and 5713a are connected to a signal transmission control circuit 30B (see FIG. 13) disposed on a printed circuit board 3B. Thus, when the shielding member 7B is fitted and housed within the recessed portion 571, the three electrodes 71Ba, 71Bb, and 71Bc formed in the outer circumferential surface of the shielding member 7B are connected to the signal transmission control circuit 30B disposed on the printed circuit board 3B through the conductor pieces 5711, 5712, and 5713 and the connecting lines 5711a, 5712a, and 5713a.

As illustrated in FIG. 12A, the outside holder 57 on the side of the core body 6B in the axial direction abuts against a stepped portion 2Bc of the casing 2B, and the outside holder 57 on an opposite side from the core body 6B also abuts against axial direction position regulating means, so that the outside holder 57 is fixed so as not to move in the axial direction within the casing 2B. An end portion on the pen tip side of the shielding member 7B abuts against a stepped portion 2Bb provided in the vicinity of an opening portion 2Ba on the pen tip side of the casing 2B. Thus, the shielding member 7B fitted to the outside holder 57 is also fixed so as not to move in the axial direction within the casing 2B.

The housing space 573 of the outside holder 57 on the side where the core body 6B is inserted has a smaller diameter than the diameter of the inside holder 58, and the through hole 572 has a larger diameter than the diameter of the core body 6B. Hence, a stepped portion 574 is formed in the housing space 573 of the outside holder 57. The stepped portion 574 prevents the inside holder 58 housed within the housing space 573 from falling off from the outside holder 57 to the core body 6B side.

As illustrated in FIG. 12A, the inside holder 58 holds the pressure sensing device 59 constituting a pen pressure detecting element. The pressure sensing device 59 is formed by a semiconductor chip constituting a capacitance type pressure sensing unit. The pressure sensing device 59 is configured as a variable capacitance capacitor constituted of a MEMS (Mico Electro Mechanical Systems) element, the variable capacitance capacitor having a capacitance variable according to a pen pressure as disclosed in Japanese Patent Laid-Open No. 2013-161307, for example. The pressure sensing device 59 can be formed by using a semiconductor element. The configuration of the pressure sensing device 59 is described in the above-described publication, and therefore description thereof will be omitted here. Though not illustrated, two electrodes of the variable capacitance capacitor formed by the pressure sensing device 59 are connected to the signal transmission control circuit 30B formed on the printed circuit board 3B.

A pressure transmitting member 8B for transmitting a pressure applied to the core body 6B to the pressure sensing device 59 held by the inside holder 58 is also provided in the housing space 573 of the outside holder 57.

The pressure transmitting member 8B is constituted of a core body fitting portion 81B into which the core body 6B is fitted and a pressing portion 82B that presses the pressure sensing device 59. The pressing portion 82B has a projecting portion 82Ba that presses the pressure sensing device 59. The core body fitting portion 81B has a recessed hole 81Ba into which the core body 6B is inserted and fitted. An end portion 6Ba of the core body 6B, which end portion is on an opposite side from the pen tip side of the core body 6B, is inserted and detachably fitted into the recessed hole 81Ba.

In the present embodiment, a conductor layer 53Ba is deposited and formed on the wall surface of the through hole 572 of the outside holder 57 by printing, deposition, or the like, and a conductor brush 53Bb is formed from the conductor layer 53Ba. Within the outside holder 57, as illustrated in FIG. 12A, a connecting line 53Bc for connecting the conductor layer 53Ba and the signal transmission control circuit 30B on the printed circuit board 3 is provided by insert molding, for example.

Hence, when the core body 6B as a conductor is inserted through the through hole 572 of the outside holder 57, and fitted into the core body fitting portion 81B of the pressure transmitting member 8B, the core body 6B is electrically connected to the conductor layer 53Ba via the conductor brush 53Bb of the through hole 572, as illustrated in FIG. 12A. Consequently, the core body 6B as a conductor is connected to an output terminal of an oscillating circuit in the signal transmission control circuit 30B on the printed circuit board 3B, and the core body 6B operates as a signal electrode.

In the position indicator 1B according to the third embodiment having a configuration as described above, when a pen pressure is applied to the core body 6B, the pressure transmitting member 8B engaged with the core body 6B in the pen pressure detector 5B is displaced within the outside holder 57 so as to press the pressure sensing device 59 in the axial direction according to the applied pen pressure. The capacitance of the variable capacitance capacitor formed between the two electrodes of the pressure sensing device 59 therefore changes according to the pen pressure. The position indicator 1B detects the pen pressure applied to the core body 6B on the basis of the change in the capacitance as in the foregoing, disposes the detected pen pressure data as an ASK modulated signal in the transmission period of additional information, and sends out the ASK modulated signal to the position detecting device.

The signal transmission control circuit 30B of the position indicator 1B according to the present third embodiment performs switching control of the three electrodes 71Ba, 71Bb, and 71Bc of the shielding member 7B in a state of sending out a signal to the sensor of the position detecting device through the core body 6B. Thus, from the signal received from the position indicator 1B, the position detecting device 201 detects a position indicated by the position indicator 1B, and detects the inclination angle and rotation angle of the position indicator 1B. In the following, description will be made of an example of constitution and operation of the signal transmission control circuit 30B of the position indicator 1B according to the present third embodiment.

[Example of Constitution and Example of Operation of Signal Transmission Control Circuit 30B of Position Indicator 1B according to Third Embodiment]

Figure 13:
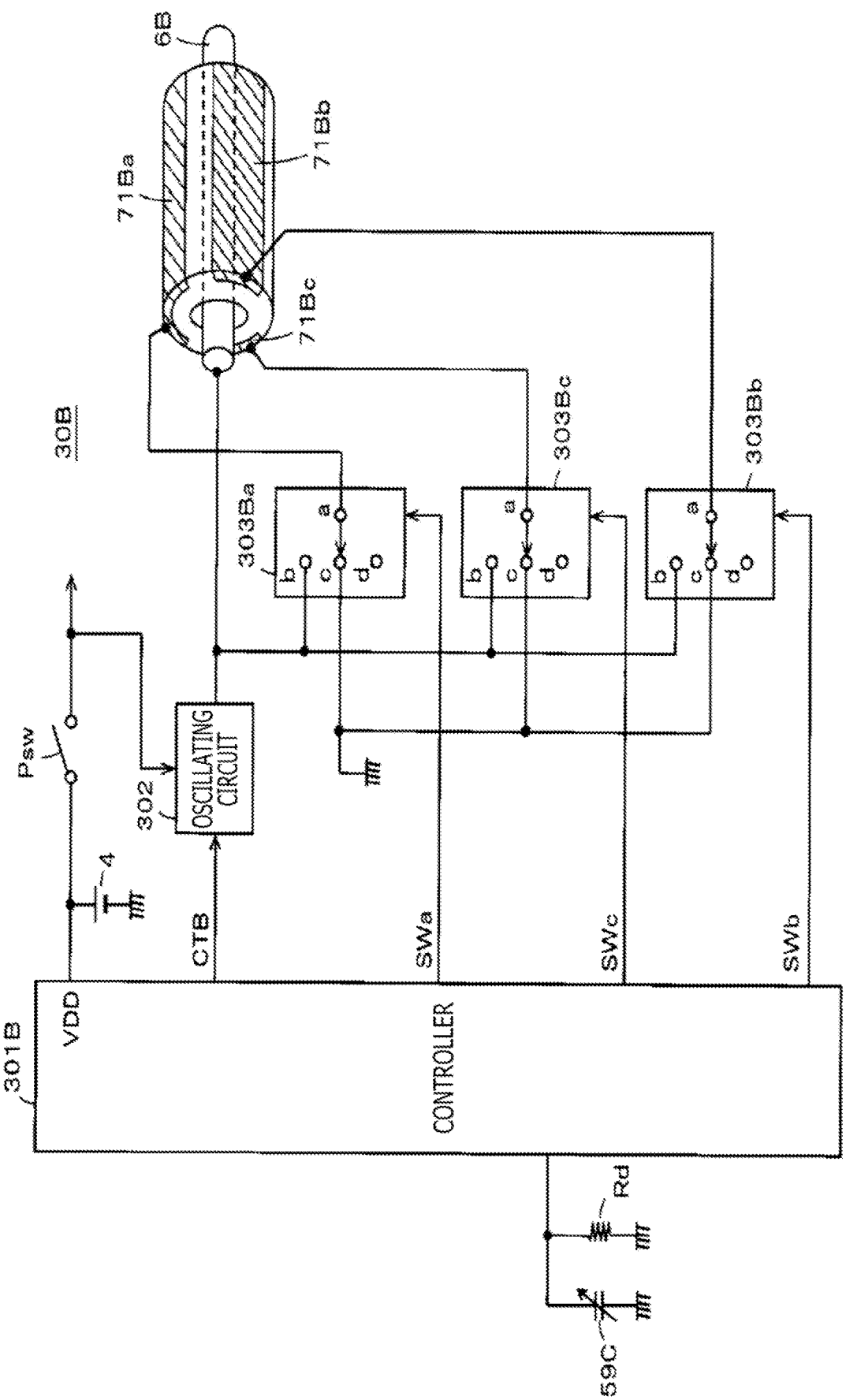
FIG. 13 is a diagram illustrating an example of constitution of a signal transmission control circuit of the position indicator according to the third embodiment of the present disclosure.

FIG. 13 illustrates an example of constitution of the signal transmission control circuit 30B of the position indicator 1B according to the third embodiment. In FIG. 13, the same parts as in the signal transmission control circuit 30 of the position indicator 1 according to the first embodiment described with reference to FIG. 3 are identified by the same reference numerals, and description thereof will be omitted.

A controller 301B is formed by a microprocessor as with the controller 301 in the first embodiment. The controller 301B is different from the controller 301 in the first embodiment only in terms of a manner of control of electronic parts connected to the controller 301B.

The controller 301B is supplied with a power supply voltage VDD from a battery 4 as a power supply circuit, and is connected with an oscillating circuit 302. The controller 301B supplies an enable signal CTB as a control signal to the oscillating circuit 302. In addition, the controller 301B is connected with a variable capacitance capacitor 59C formed by the pressure sensing device 59 of the pen pressure detector 5B, and a discharging resistor Rd is connected in parallel with the variable capacitance capacitor 59C.

In the third embodiment, the signal transmission control circuit 30B is provided with three switch circuits 303Ba, 303Bb, and 303Bc for switching respective electric states of the three electrodes 71Ba, 71Bb, and 71Bc of the shielding member 7B. The three electrodes 71Ba, 71Bb, and 71Bc are respectively connected to the respective movable terminals a of the three switch circuits 303Ba, 303Bb, and 303Bc.

The switch circuits 303Ba, 303Bb, and 303Bc each have a fixed terminal b supplied with a signal from the oscillating circuit 302, have a fixed terminal c grounded, and have a fixed terminal d as a free end. The switch circuit 303Ba is supplied with a switching control signal SW from the controller 301B, the switch circuit 303Bb is supplied with a switching control signal SWb from the controller 301B, and the switch circuit 303Bc is supplied with a switching control signal SWc from the controller 301B. The switch circuits 303Ba, 303Bb, and 303Bc are thereby switching-controlled.

In the present third embodiment, the position indicator 1B notifies a state of shielding of the core body 6B by the shielding member 7B to the sensor of the position detecting device 201 by using the second example of the signal transmission control method in the first embodiment.

In addition, in the present third embodiment, the signal from the oscillating circuit 302 is sent out not only from the core body 6B but also from the three electrodes 71Ba, 71Bb, and 71Bc of the shielding member 7B in a so-called hovering state, in which the tip portion of the core body 6B of the position indicator 1B is not in contact with the sensor of the position detecting device 201. The position detecting device 201 can thereby detect the position of the position indicator 1B even when the position indicator 1B is in the hovering state.

Incidentally, in the present example, the controller 301B determines whether or not the position indicator 1B is in the hovering state on the basis of a pen pressure detected on the basis of the capacitance of the pressure sensing device 59 of the pen pressure detector 5B.

Figure 14:
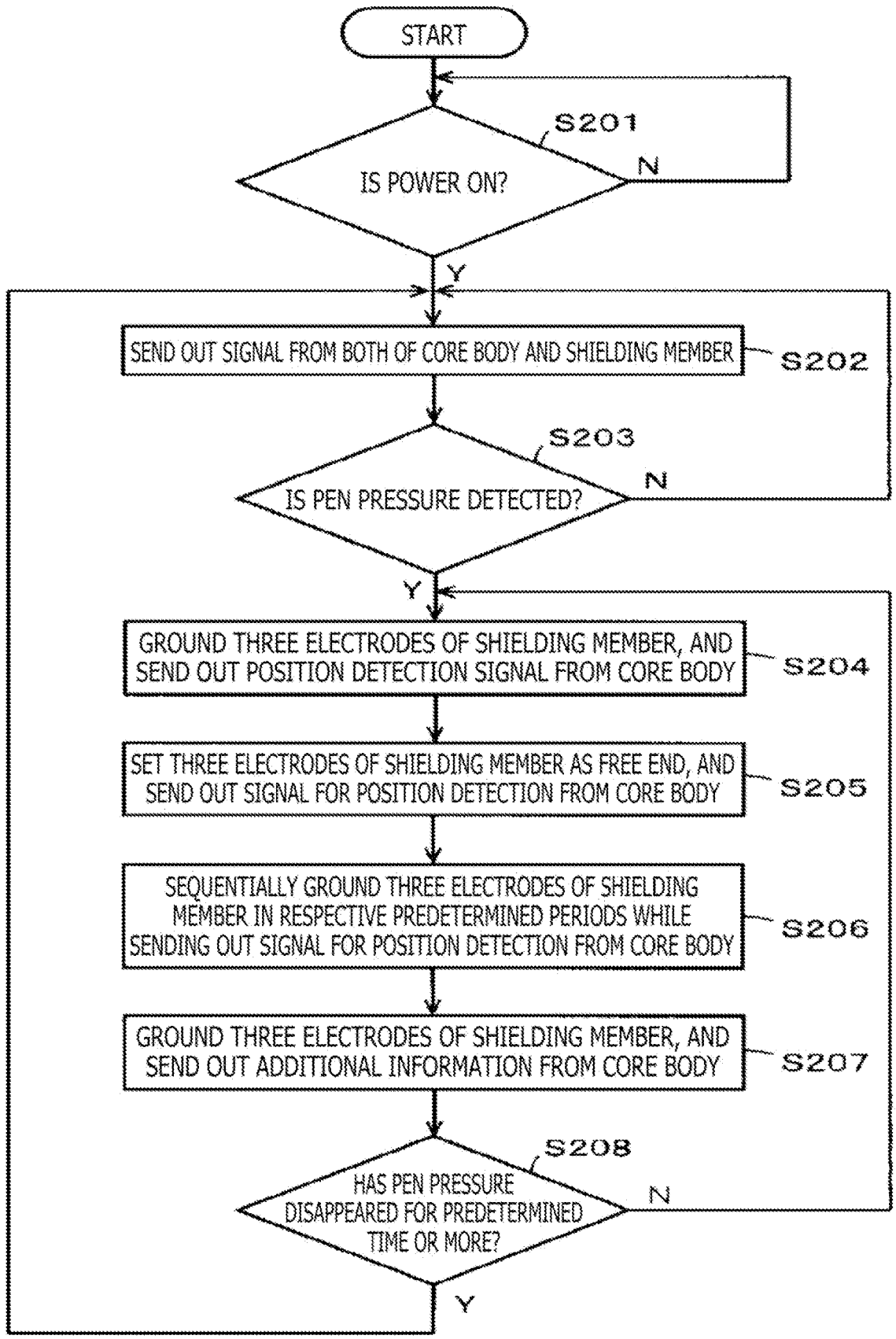
FIG. 14 is a flowchart of assistance in explaining operation of parts of the position indicator according to the third embodiment of the present disclosure.

FIG. 14 is a flowchart of assistance in explaining an example of processing operation of the controller 301B of the signal transmission control circuit 30B of the position indicator 1B according to the present third embodiment. In addition, FIG. 15 is a timing diagram of assistance in explaining a signal transmission control method in the signal transmission control circuit 30B when the tip portion of the core body 6B of the position indicator 1B is in contact with the sensor of the position detecting device 201. In the following, referring to FIG. 14 and FIG. 15, description will be made of the transmission signal control method in the signal transmission control circuit 30B of the position indicator 1B according to the present third embodiment.

As illustrated in FIG. 14, the controller 301B determines whether or not power supply is on, on the basis of whether the power switch Psw is on (S201). When the controller 301B determines at S201 that the power is on, the controller 301B sends out a signal from the core body 6B by performing control so as to send out the signal in the hovering state by the enable signal CTB supplied to the oscillating circuit 302, and performs control so as to send out the signal in the hovering state from all of the three electrodes 71Ba, 71Bb, and 71Bc by switching-controlling the movable terminals a of the switch circuits 303Ba, 303Bb, and 303Bc to a state of being connected to the fixed terminals b by the switching control signals SWa, SWb, and SWc (S202). Here, the signal in the hovering state is, for example, a signal such as repeats a burst signal not including additional information such as pen pressure information or the like in predetermined cycles.

Then, the controller 301B determines whether or not a pen pressure is detected, by detecting the capacitance of the variable capacitance capacitor 59C formed by the pressure sensing device 59 of the pen pressure detector 5 as described above (S203). When the controller 301B determines at S203 that no pen pressure is detected, the controller 301B returns the processing to S202, and repeats the processing from S202 on down.

When the controller 301B determines at S203 that a pen pressure is detected and that the pen tip of the core body 6B of the position indicator 1B is therefore in contact with the sensor surface of the sensor of the position detecting device 201, the controller 301B sequentially performs S204 to S207, and thereby performs signal transmission control to make the position detecting device 201 detect a position indicated by the position indicator 1B, and make the position detecting device 201 detect the inclination angle of the axial direction of the core body 6B of the position indicator 1B with respect to the sensor surface and the rotation of the position indicator 1B, as will be described in the following.

This signal transmission control is performed by repeating, as one cycle Tc, a period constituted of a transmission period PBs of a signal for position detection and a transmission period PBad of additional information as illustrated in portion (A) of FIG. 15. In this case, the transmission period PBs of the signal for position detection is a period having a length five times that of the sending-out period of the signal for position detection in which period a position indicated by the position indicator 1B can be detected on the position detecting device side, as described with reference to portions (A) and (C) of FIG. 6. The transmission period PBad of the additional information may be similar to the transmission period of the additional information as described with reference to portions (A) and (C) of FIG. 6.

When the controller 301B determines at S203 that a pen pressure is detected, as illustrated in FIG. 15, the controller 301B sends out a signal for position detection from the oscillating circuit 302, and grounds all of the three electrodes 71Ba, 71Bb, and 71Bc by switching-controlling the movable terminals a of the switch circuits 303Ba, 303Bb, and 303Bc to a state of being connected to the fixed terminals c by the switching control signal SW (see portion (B) of FIG. 15), the switching control signal SWb (see portion of (C) of FIG. 15), and the switching control signal SWc (see portion (D) of FIG. 15) in a first sending-out period P1 having ⅕ of the length of the transmission period PBs (S204). The core body 6B thereby sends out the signal for position detection to the sensor through the core body 6B in a state in which electrostatic shielding is performed by the three electrodes 71Ba, 71Bb, and 71Bc (shield on).

Next, when the first sending-out period P1 is ended, and a second transmission period P2 having ⅕ of the length of the transmission period PBs arrives, the controller 301B sets all of the three electrodes 71Ba, 71Bb, and 71Bc in a state of floating in terms of potential by switching-controlling the movable terminals a of the switch circuits 303Ba, 303Bb, and 303Bc to a state of being connected to the fixed terminals d by the switching control signal SW (see portion (B) of FIG. 15), the switching control signal SWb (see portion (C) of FIG. 15), and the switching control signal SWc (see portion of (D) FIG. 15) (S205). The core body 6B thereby sends out the signal for position detection to the sensor through the core body 6B in a state in which the electrostatic shielding by the three electrodes 71Ba, 71Bb, and 71Bc is cleared.

As described above, the position detecting device detects a received signal as the signal from the position indicator 1B in the transmission period P1, and can detect a position indicated by the position indicator 1B from the level of the received signal. In addition, the position detecting device detects received signals as the signals from the position indicator 1B in the two transmission periods, that is, the transmission period P1 and the transmission period P2, and can detect the inclination angle of the axial direction of the core body 6B of the position indicator 1B with respect to the sensor surface from a difference between positions on the sensor, at which positions the levels of the received signals exhibit peak values.

Next, after the second sending-out period P2 is ended, the controller 301B controls one of the three electrodes 71Ba, 71Bb, and 71Bc to a grounded state in each of a third transmission period P3, a fourth transmission period P4, and a fifth transmission period P5 each having ⅕ of the length of the transmission period PBs (S206). Specifically, in the example of FIG. 15, in the third transmission period P3, control is performed so as to connect the movable terminal a of the switch circuit 303Ba to the fixed terminal c by the switching control signal SW (see portion (B) of FIG. 15), and connect the movable terminals a of the switch circuit 303Bb and the switch circuit 303Bc to the fixed terminals d by the switching control signal SWb (see portion (C) of FIG. 15) and the switching control signal SWc (see portion (D) of FIG. 15).

Thus, the core body 6B is electrostatically shielded by only one of the three electrodes 71Ba, 71Bb, and 71Bc in each of the third transmission period P3, the fourth transmission period P4, and the fifth transmission period P5. Hence, the position detecting device receives a received signal differing according to the electrode acting as an electrostatic shield and the electrodes in which electrostatic shielding is cleared in each of the third transmission period P3, the fourth transmission period P4, and the fifth transmission period P5. Hence, the position detecting device can detect in which direction and to which degree the position indicator 1B is rotated according to a change in the received signal.

Next, when the fifth sending-out period P5 is ended and the transmission period PBad of additional information arrives, the controller 301B controls the oscillating circuit 302 so as to send out the additional information constituted of pen pressure data or the like, and grounds all of the three electrodes 71Ba, 71Bb, and 71Bc by switching-controlling the movable terminals a of the switch circuits 303Ba, 303Bb, and 303Bc to a state of being connected to the fixed terminals c by the switching control signal SW (see portion (B) FIG. 15), the switching control signal SWb (see portion (C) of FIG. 15), and the switching control signal SWc (see portion (D) of FIG. 15) (S204). The core body 6B thereby sends out the additional information to the sensor through the core body 6B in a state in which electrostatic shielding is cleared by the three electrodes 71Ba, 71Bb, and 71Bc (shield off).

Hence, the position detecting device can detect the additional information from the position indicator 1B.

Next, the controller 301B determines whether or not disappearance of the pen pressure applied to the core body 6B has continued for a predetermined time or more (S208). When the disappearance of the pen pressure has not continued for the predetermined time or more, the controller 301B returns the processing to S204, and repeats the transmission control processing operation in the above-described cycle Tc from S204 on down. In addition, when the controller 301B determines that the disappearance of the pen pressure has continued for the predetermined time or more, the controller 301B returns the processing to S202, and repeats the processing from S202 on down.

Here, the predetermined time for which the disappearance of the pen pressure is determined to have continued at S208 is a time such that the user temporarily stops indication input on the sensor surface by the position indicator 1B. Therefore, when the user temporarily separates the position indicator 1B from the sensor surface and immediately performs indication input by bringing the position indicator 1B into contact with the sensor surface again, the operation of repeating the above-described cycle Tc can be continued assuming the state in which the pen pressure is detected. This is thus convenient.

According to the position indicator 1B in accordance with the foregoing third embodiment, the position detecting device can detect not only the inclination angle of the core body 6B of the position indicator 1B with respect to the sensor surface but also the rotation of the position indicator 1B. Though inclination detection accuracy is decreased, it is also possible to omit the shield-off period in the interval for inclination angle detection, and calculate the inclination angle from the signals detected during the interval for rotation detection.

[Modifications of Third Embodiment]

The foregoing third embodiment notifies the state of shielding of the core body 6B by the shielding member 7B, by using the second example of the signal transmission control method in the first embodiment. However, it is also possible to apply the first example of the signal transmission control method in the first embodiment. In that case, it suffices to include, in the signal sent out from the position indicator 1B, information notifying the position detecting device of the state of electrostatic shielding by all of the three electrodes 71Ba, 71Bb, and 71Bc and the state of electrostatic shielding by each electrode.

In addition, also in the third embodiment, as in the second embodiment, signal sending-out control for detecting the inclination angle and the rotation may be performed in response to a request signal from the position detecting device side. In that case, as in the second embodiment, a method may be adopted in which a conductor such as a conductor sleeve or the like is provided to the pen tip side of the casing of the position indicator as in the second embodiment, and the request signal from the position detecting device is received by electrostatic coupling between the conductor sleeve and the sensor of the position detecting device, or as illustrated in FIG. 11, the request signal may be sent and received by communication between the position indicator and the position detecting device using wireless communication means using radio waves or the like.

In addition, without the conductor sleeve being provided, the core body may be controlled on a time-division basis for signal transmission and for receiving the request signal from the position detecting device. This can be applied also to the case of the foregoing second embodiment.

Incidentally, in the foregoing third embodiment, three electrodes are provided by dividing the conductor of the shielding member into three parts in the circumferential direction in order to make the position detecting device detect rotation of the position indicator. However, the number of divisions of the conductor may be any number as long as the number is two or more.

Other Embodiments or Modifications

Incidentally, the coupled state enabling electrostatic interaction between the position indicator and the sensor of the position detecting device may be detected as a state of touching the sensor on the basis of pen pressure detection by the pen pressure detector 5, or may be detected on the basis of the level of a signal received from the sensor through the conductor sleeve or the core body.

In the case where the position indicator and the position detecting device are connected to each other by wireless communication means using radio waves, whether the coupled state enabling electrostatic interaction between the position indicator and the sensor of the position detecting device is set may be determined on the position detecting device side, and when the coupled state is determined, the coupled state may be notified to the position indicator by wireless communication.

In the foregoing embodiments, the pen pressure detector uses a member or an element constituting a variable capacitance capacitor in order to detect a pen pressure applied to the core body. However, without limitation to this, a structure or an element having an inductance value or a resistance value variable according to a pen pressure may be used.

DESCRIPTION OF REFERENCE SYMBOLS

1, 1A, 1B . . . Position indicator, 2 . . . Casing, 3 . . . Printed circuit board, 5, 5A, 5B . . . Pen pressure detector, 6, 6A, 6B . . . Core body, 7, 7A, 7B . . . Shielding member, 8 . . . Pressure transmitting member, 9 . . . Wireless communicating unit, 30, 30A, 30B . . . Signal transmission control circuit, 301, 301A, 301B . . . Controller, 302, 302A . . . Oscillating circuit, 304 . . . Power supply circuit, 305 . . . Received signal detecting circuit, 303, 303A, 303Ba, 303Bb, 303Bc . . . Switch circuit

The invention claimed is:
1. A position indicator that electrostatically interacts with a position detecting device including a sensor, the position indicator comprising:
   a casing having a pen shape;
   a conductive core body including a pen tip that protrudes from an opening on one end in an axial direction of the casing;
   a first conductor surrounding the conductive core body;
   a signal generating circuit which, in operation, generates a signal that is supplied to the conductive core body for electrostatically interacting with the sensor of the position detecting device;
   a power supply circuit having a charging element that is selectively electrically coupled to the first conductor surrounding the conductive core body; and
   a control circuit which, in operation, electrically controls the conductive core body and the first conductor surrounding the conductive core body,
   wherein the first conductor surrounding the conductive core body, in operation, electromagnetically charges the charging element in the power supply circuit,
   wherein the control circuit, in operation, electrically controls the first conductor surrounding the conductive core body in response to receiving a request signal transmitted from an external device, wherein the request signal requests one or more of: charging of the charging element of the power supply circuit, electrostatic transmission of the signal generated by the signal generating circuit to the position detecting device, and electrostatic shielding of the conductive core body,
   wherein, when the request signal requests electromagnetic charging of the charging element of the power supply circuit, the control circuit, in operation, electrically controls the first conductor surrounding the conductive core body, while the conductive core body is not electrostatically shielded, and
   wherein the control circuit, in operation, electrically controls the first conductor surrounding the conductive core body such that electromagnetic charging of the charging element of the power supply circuit and electrostatic shielding of the conductive core body are conducted in a time-divisional fashion.
2. The position indicator according to claim 1, wherein the external device includes the position detecting device.
3. The position indicator according to claim 1, wherein the charging element is a rechargeable secondary battery or a capacitor.
4. The position indicator according to claim 1, wherein, when the request signal requests electrostatic charging of the charging element of the power supply circuit, the control circuit, in operation, electrically controls the first conductor surrounding the conductive core body, while the signal generated by the signal generating circuit is not electrostatically transmitted to the position detecting device using the first conductor.
5. The position indicator according to claim 4, wherein the control circuit, in operation, electrically controls the first conductor surrounding the conductive core body such that electromagnetic charging of the charging element of the power supply circuit and electrostatic transmission of the signal to the position detecting device are conducted in a time-divisional fashion.
6. The position indicator according to claim 1, wherein the request signal from the external device is received electrostatically.

7. The position indicator according to claim 1,
wherein the request signal from the external device is received wirelessly via a radio signal receiving circuit.

8. The position indicator according to claim 7,
wherein the radio signal receiving circuit receives the request signal using a Bluetooth protocol.

9. A position indicator that electrostatically interacts with a position detecting device including a sensor, the position indicator comprising:
a casing having a pen shape;
a conductive core body including a pen tip that protrudes from an opening on one end in an axial direction of the casing;
a first conductor surrounding the conductive core body;
a signal generating circuit which, in operation, generates a signal that is supplied to the conductive core body for electrostatically interacting with the sensor of the position detecting device;
a power supply circuit having a charging element that is selectively electrically coupled to the first conductor surrounding the conductive core body; and
a control circuit which, in operation, electrically controls the conductive core body and the first conductor surrounding the conductive core body,
wherein the first conductor surrounding the conductive core body, in operation, electromagnetically charges the charging element in the power supply circuit,
wherein the control circuit, in operation, electrically controls the first conductor surrounding the conductive core body in response to receiving a request signal transmitted from an external device, wherein the request signal requests one or more of: charging of the charging element of the power supply circuit, electrostatic transmission of the signal generated by the signal generating circuit to the position detecting device, and electrostatic shielding of the conductive core body, and
wherein, when the request signal requests electrostatic shielding of the conductive core body, the control circuit, in operation, electrically controls the first conductor surrounding the conductive core body, while the signal supplied to the conductive core body from the signal generating circuit is electrostatically transmitted to the position detecting device from the conductive core body.

10. A position indicator that electrostatically interacts with a position detecting device including a sensor, the position indicator comprising:
a casing having a pen shape;
a conductive core body including a pen tip that protrudes from an opening on one end in an axial direction of the casing;
a first conductor surrounding the conductive core body;
a signal generating circuit which, in operation, generates a signal that is supplied to the conductive core body for electrostatically interacting with the sensor of the position detecting device;
a power supply circuit having a charging element that is selectively electrically coupled to the first conductor surrounding the conductive core body; and
a control circuit which, in operation, electrically controls the conductive core body and the first conductor surrounding the conductive core body,
wherein the first conductor surrounding the conductive core body, in operation, electromagnetically charges the charging element in the power supply circuit,
wherein the control circuit, in operation, electrically controls the first conductor surrounding the conductive core body in response to receiving a request signal transmitted from an external device, wherein the request signal requests one or more of: charging of the charging element of the power supply circuit, electrostatic transmission of the signal generated by the signal generating circuit to the position detecting device, and electrostatic shielding of the conductive core body, and
wherein the control circuit, in operation, electrically controls the conductive core body and the first conductor surrounding the conductive core body such that the signal generated by the signal generating circuit is transmitted from the conductive core body in a time-divisional fashion to the position detecting device in response to receiving a request signal that requests tilt angle information indicating a tilt angle of the position indicator on the position detecting device.

11. A position indicator that electrostatically interacts with a position detecting device including a sensor, the position indicator comprising:
a casing having a pen shape;
a conductive core body including a pen tip that protrudes from an opening on one end in an axial direction of the casing;
a conductor sleeve surrounding the conductive core body;
a first conductor installed in the casing of the position indicator;
a signal generating circuit which, in operation, generates a signal that is supplied to the conductive core body for electrostatically interacting with the sensor of the position detecting device;
a power supply circuit having a charging element that is electrically coupled to the first conductor having installed in the casing of the position indicator; and
a control circuit which, in operation, controls the conductive core body, the conductor sleeve, and the first conductor installed in the casing of the position indicator in response to receiving a request signal transmitted from an external device;
wherein the conductive core body is controlled to electrostatically transmit the signal supplied from the signal generating circuit to the position detecting device,
wherein the conductor sleeve surrounding the conductive core body is controlled at least to receive the request signal transmitted from the external device, and
wherein the first conductor installed in the casing of the position indicator is controlled to conduct electromagnetic charging of the charging element of the power supply circuit for driving the position indicator.

12. The position indicator according to claim 11,
wherein the external device includes the position detecting device.

13. The position indicator according to claim 11,
wherein the charging element is a rechargeable secondary battery or a capacitor.

14. The position indicator according to claim 11,
wherein the conductor sleeve surrounding the conductive core body is further controlled to transmit the signal generated by the signal generating circuit for electrostatically interacting with the sensor of the position detecting device.

15. The position indicator according to claim 14,
wherein signal reception and signal transmission through the conductor sleeve surrounding the conductive core body are controlled by the control circuit in response to receiving a request signal transmitted from the position detecting device.

16. The position indicator according to claim 15,
wherein signal reception and signal transmission through the conductor sleeve surrounding the conductive core body are controlled by the control circuit in a time-divisional fashion.

17. The position indicator according to claim 11,
wherein the request signal transmitted from the external device is received electrostatically.

18. The position indicator according to claim 11,
wherein the request signal transmitted from the external device is received wirelessly via a radio signal receiving circuit.

19. The position indicator according to claim 18,
wherein the radio signal receiving circuit receives the request signal using a Bluetooth protocol.

20. The position indicator according to claim 11,
wherein the control circuit, in operation, electrically controls the conductive core body and the first conductor installed in the casing of the position indicator to transmit the signal supplied from the signal generating circuit to the position detecting device in a time-divisional fashion in response to receiving a request signal from the position detecting device.

* * * * *